United States Patent
Toyama et al.

(10) Patent No.: US 8,565,591 B2
(45) Date of Patent: Oct. 22, 2013

(54) LENS BARREL AND CAMERA SYSTEM

(75) Inventors: Mitsuru Toyama, Hachioji (JP); Tamotsu Koiwai, Akiruno (JP); Takeshi Ito, Hino (JP)

(73) Assignee: Olympus Imaging Corp. (JP)

( * ) Notice: Subject to any disclaimer, the term of this patent is extended or adjusted under 35 U.S.C. 154(b) by 0 days.

(21) Appl. No.: 13/480,844

(22) Filed: May 25, 2012

(65) Prior Publication Data

US 2012/0328276 A1    Dec. 27, 2012

(30) Foreign Application Priority Data

Jun. 24, 2011    (JP) .................................. 2011-140803

(51) Int. Cl.
G03B 13/34    (2006.01)
G02B 7/04    (2006.01)

(52) U.S. Cl.
USPC ............ 396/131; 396/137; 396/147; 359/825

(58) Field of Classification Search
USPC ........................... 396/131, 137, 147; 359/825
See application file for complete search history.

(56) References Cited

U.S. PATENT DOCUMENTS

| | | | | |
|---|---|---|---|---|
| 4,984,000 A | * | 1/1991 | Watanabe et al. | 396/87 |
| 5,918,078 A | * | 6/1999 | Imura et al. | 396/137 |
| 6,301,441 B1 | * | 10/2001 | Kato | 396/131 |
| 2007/0147818 A1 | * | 6/2007 | Mori | 396/144 |
| 2009/0279192 A1 | * | 11/2009 | Harada et al. | 359/825 |
| 2012/0328276 A1 | * | 12/2012 | Toyama et al. | 396/85 |

FOREIGN PATENT DOCUMENTS

JP    2011-033795    2/2011

* cited by examiner

*Primary Examiner* — William B Perkey
(74) *Attorney, Agent, or Firm* — Volpe and Koenig, P.C.

(57) ABSTRACT

A lens barrel includes an operation member adapted to be movable to a first position and a second position and turnable at each of the positions, a turning member adapted to turnably engage with the operation member at the second position, and disengage from the operation member at the first position, a first detection unit adapted to detect a turning position of the turning member configured to turn in engagement with the operation member, a second detection unit adapted to detect a turning amount and a rotational direction of the operation member when the operation member is disengaged from the turning member, and a moving unit adapted to move the focusing lens along the optical axis based on an output from the first detection unit or the second detection unit.

11 Claims, 18 Drawing Sheets

LENS BARREL AND CAMERA SYSTEM

CROSS REFERENCE TO RELATED APPLICATION

This application claims the benefit of Japanese Application No. 2011-140803 filed in Japan on Jun. 24, 2011, the contents of which are incorporated herein by this reference.

BACKGROUND

1. Field of the Invention

The present invention relates to a lens barrel which allows a moving position of a focus lens to be specified by rotating an operation member as well as to a camera system which uses the lens barrel. More particularly, the present invention relates to a lens barrel which allows a user to switch among plural manual focusing modes by moving the operation member used to specify the moving position of the focus lens along an optical axis as well as to a camera system which uses the lens barrel.

2. Description of the Related Art

A lens barrel is known which is equipped with a turnable operation ring on the lens barrel and is adapted to align distance information indicated on the operation ring with aperture stop information indicated on a fixed member when the operation ring is rotated, determine a moving position of a focus lens, and move the focus lens to an absolute in-focus position using an actuator. Also, a lens barrel is known which displays subject distance information in an information display window during manual focusing and hides the subject distance information during automatic focusing.

For example, a lens barrel disclosed in Japanese Patent Application Laid-Open Publication No. 2011-33795 includes: a manual focus ring 43 used to drive a lens barrel 6 to adjust focus when turned during automatic focusing or manual focusing; and a focus switching ring 47 adapted to rotate around an optical axis and thereby move an intermediate ring 46 and a distance indicator ring 45 along the optical axis, where the intermediate ring 46 is connected to the focus switching ring 47 via a cam and the distance indicator ring 45 is turnably coupled to the intermediate ring 46, wherein during automatic focusing, the distance indicator ring 45 and the manual focus ring 43 are decoupled from each other, making distance information no longer visible in an information display window of the focus switching ring 47, and during manual focusing, the distance indicator ring 45 and the manual focus ring 43 are coupled to each other, making the distance information visible in the information display window of the focus switching ring 47.

With the lens barrel disclosed in Japanese Patent Application Laid-Open Publication No. 2011-33795 described above, switching between an automatic focusing state and a manual focusing state is done by turning the focus switching ring 47, and focus adjustment settings during automatic focusing or manual focusing can be made using a manual focus ring 43 provided separately from the focus switching ring 47.

SUMMARY

The present invention provides a lens barrel comprising: a fixed portion in which an optical system including a focusing lens is placed; an operation member placed so as to be movable to a first position and a second position along an optical axis of the fixed portion and turnable around the optical axis at each of the first position and the second position; a turning member adapted to turnably engage with the operation member when the operation member moves to the second position, and disengage from the operation member when the operation member moves from the second position to the first position; first detection means adapted to detect a turning position of the turning member when the operation member and the turning member turn in engagement at the second position; second detection means adapted to detect a turning amount and a rotational direction of the operation member when the operation member turns by being disengaged from the turning member after moving to the first position; and moving means placed in the fixed portion and adapted to move the focusing lens along the optical axis based on a computational value obtained by computation using at least an output value from the first or second detection means.

Also, the present invention provides a camera system comprising a camera body and a lens barrel detachable from the lens barrel, the camera body and the lens barrel being able to communicate with each other wherein: the lens barrel comprises: a fixed portion in which an optical system including a focusing lens is placed, an operation member placed so as to be movable to a first position and a second position along an optical axis of the fixed portion and turnable around the optical axis at each of the first position and the second position, a turning member adapted to turnably engage with the operation member when the operation member moves to the second position, and disengage from the operation member when the operation member moves from the second position to the first position, first detection means adapted to detect a turning position of the turning member when the operation member and the turning member turn in engagement at the second position, second detection means adapted to detect a turning amount and a rotational direction of the operation member when the operation member turns by being disengaged from the turning member after moving to the first position, and moving means placed in the fixed portion and adapted to move the focusing lens along the optical axis; the camera body comprises control means adapted to move the focusing lens along the optical axis by controlling the moving means based on an output from the first detection means or the second detection means; and the control means moves the focusing lens to a predetermined position starting from a current position of the focusing lens by an amount of travel based on the rotational direction and turning amount detected by the first detection means when moving the focusing lens along the optical axis based on an output from the first detection means, and moves the focusing lens to a predetermined corresponding position using the turning position detected by the second detection means as an absolute position when moving the focusing lens along the optical axis based on an output from the second detection means.

Benefits of the invention will become more apparent from the following detailed description.

BRIEF DESCRIPTION OF THE DRAWING(S)

DETAILED DESCRIPTION OF THE PREFERRED EMBODIMENTS

Figure 1:
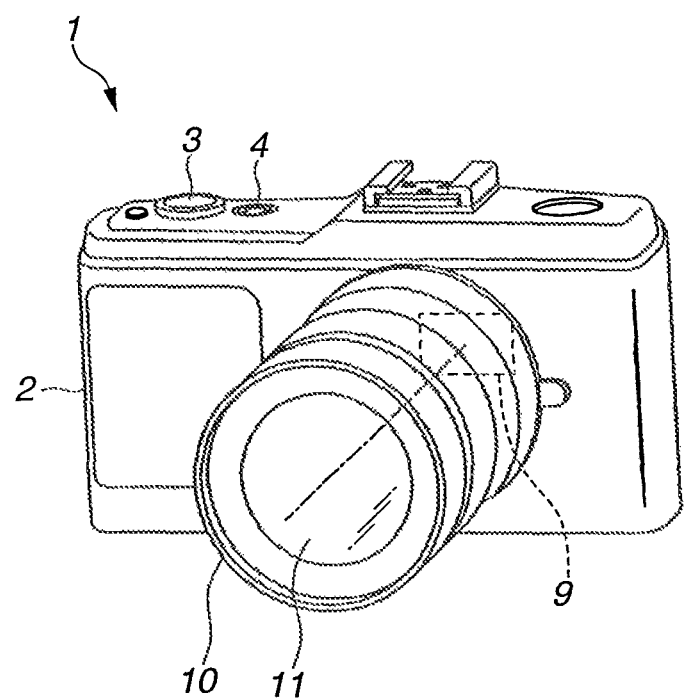
FIG. 1 is a perspective view showing a camera system according to a first embodiment of the present invention, with a lens barrel mounted on a camera body.

Preferred embodiments of the present invention will be described below with reference to the accompanying drawings. In the drawings referred to in the following description, to make each component large enough to be recognized, scaling is varied from component to component, and thus it should be noted that the present invention is not limited to quantities, shapes, size ratios, and relative positional relationships of the components shown in the drawings.

First Embodiment

A camera system according to the present embodiment is an electronic camera system which includes a camera body 2 and a lens barrel 10 as shown in FIG. 1. The electronic camera system is also referred to as a digital camera and configured to pick up and record subject images electronically.

In FIG. 1, the lens barrel 10 holds a photographic optical system 11 made up of plural lenses including a focusing lens used to form subject images. The camera body 2 is provided with an image pickup device 9 (a charge-coupled device such as a CCD or a backside-illuminated CMOS (complimentary metal-oxide semiconductor) sensor) adapted to receive a photographic light flux entering through the photographic optical system 11, using a light-receiving surface (pixel area) and output an electrical signal with a predetermined timing.

The camera body 2 and the lens barrel 10 are configured to be detachable from each other by means of an engaging mechanism generally known as a bayonet mount. Incidentally, in the camera system 1, a mechanism which allows the camera body 2 and the lens barrel 10 to be separable is not limited to a mechanism according to the present embodiment. For example, a configuration generally know as a screw mount which uses a screw mechanism may be used or the camera body 2 and the lens barrel 10 may be configured to be separable by a mechanism which uses a fit or a magnet.

Furthermore, a release switch 3 and a power switch 4 are disposed on top part of the camera body 2, where the release switch 3 is used by a user to enter an image pick up operation command and the power switch 4 is used by the user to enter a power ON/OFF operation command for the camera body 2.

The release switch 3 is a pushbutton switch made up of two switches—a first release switch 3a and a second release switch 3b—which are activated depending on two different amounts of stroke (amounts of depression). Incidentally, the release switch 3 is not limited to a switch in the form of a pushbutton, and may be another form of switch such as a touch sensor.

Figure 2:
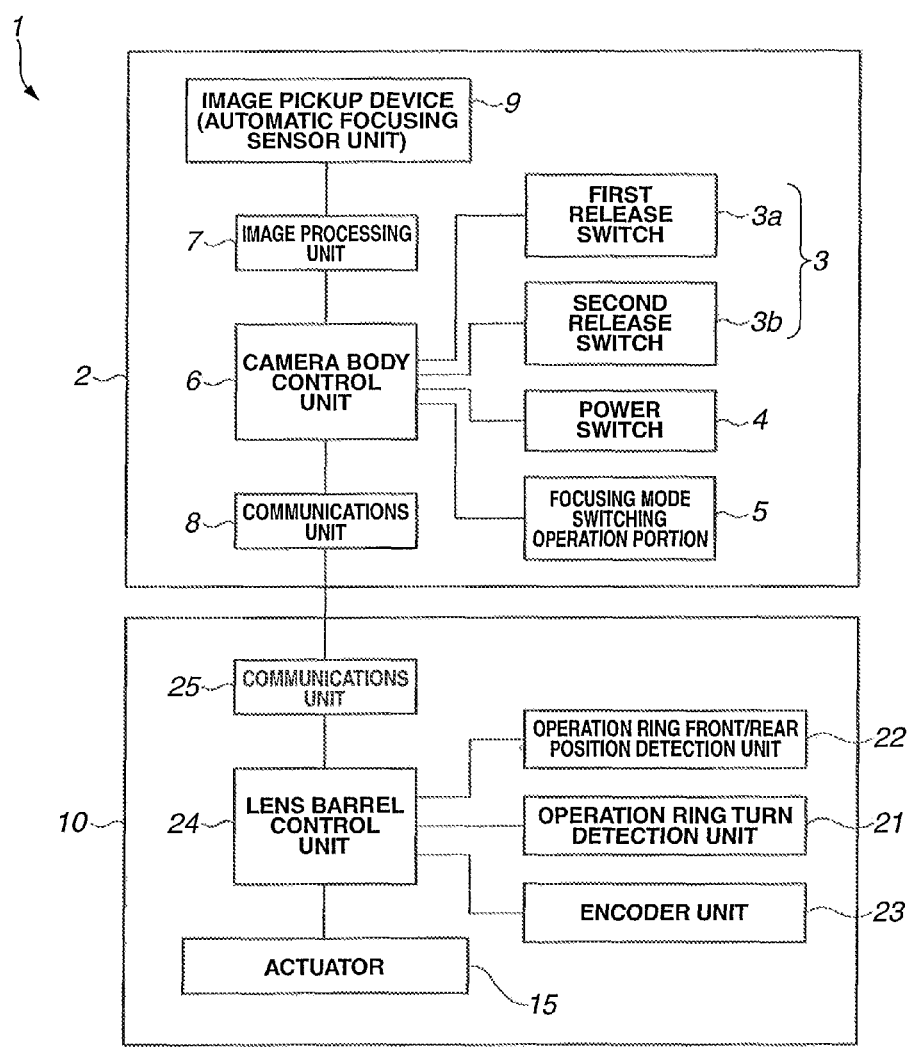
FIG. 2 is a block diagram of a configuration related to focusing operation of the camera system of FIG. 1.

FIG. 2 illustrates a configuration of a system related to focusing operation applied to the camera system 1 according to the present embodiment.

As shown in FIG. 2, the release switch 3, the power switch 4, a focusing mode switching operation portion 5, a camera body control unit 6, an image processing unit 7, a communications unit 8, and the image pickup device 9 are disposed in the camera body 2, where the image pickup device 9 is an automatic focusing sensor unit.

The release switch 3 and the power switch 4 are as described above, and thus the other components will be described.

Although concrete configuration is not illustrated, the focusing mode switching operation portion 5 shown in FIG. 2 is used to select an automatic focusing operation mode for performing automatic focusing operation or a manual focusing operation mode for performing manual focusing operation. By operating the focusing mode switching operation portion 5, the user selects which modes to set, the normal automatic focusing operation mode or the manual focusing operation mode.

Operation of the camera system 1 in the automatic focusing operation mode and the manual focusing operation mode will be described later.

Although concrete configuration is not illustrated, the focusing mode switching operation portion 5 may be in the form of a button switch, a touch sensor, or a dial switch. For example, the camera body 2 may be equipped with an image display apparatus which displays a menu, allowing the user to switch the focusing operation mode by selecting a menu item via a touch sensor or a button switch.

Alternatively, the focusing mode switching operation portion 5 may be disposed on the lens barrel 10 rather than the camera body 2.

The camera body control unit 6 includes a computing unit (CPU), a storage device (RAM), input/output device, power control device, and the like and controls operation of the camera body 2 based on a predetermined program.

The image processing unit 7 is an electronic circuit unit intended to perform image processing and adapted to form a subject image based on a signal outputted from the image pickup device 9 and calculate a contrast value during focusing based on the subject image.

A mounting pattern of the image processing unit 7 on the camera body 2 may be in hardware form in which the image processing computational hardware is mounted on the camera body 2 or in software form in which the computing unit of the camera body control unit 6 performs image processing based on a predetermined image processing program.

The communications unit 8 is intended to conduct wired or wireless communications with a lens barrel control unit 24 via a communications unit 25 provided in the lens barrel 10.

The image pickup device 9 described above is an automatic focusing sensor unit and is adopted to output a signal used to perform contrast-detection automatic focusing operation (autofocus operation). That is, after detecting the contrast value of the subject image based on the signal outputted from the image pickup device 9 which is an automatic focusing sensor unit, the camera system 1 according to the present embodiment performs focus adjustment of the photographic optical system 11 in such a way as to maximize the contrast value.

Incidentally, the camera system 1 may be configured to perform automatic focusing operation by means of so-called phase difference detection. In that case, in addition to the image pickup device 9, it is necessary to dispose a sensor adapted to detect phase difference of the subject image on the camera body 2. Also, the automatic focusing sensor unit may be a sensor of another form such as a range sensor.

Next, a configuration related to focusing operation applied to the lens barrel 10 will be described.

As shown in FIG. 2, an actuator 15, an operation ring turn detection unit 21, an operation ring front/rear position detection unit 22, an encoder unit 23, the lens barrel control unit 24, and a communications unit 25 are disposed in the lens barrel 10.

The actuator 15 is a mechanism adapted to advanceably/retractably drive a focusing barrel 13 holding a focus lens 11a of a photographic optical system 11 (described later) along an optical axis. The actuator 15, whose details will be described later, is made up of a screw 15a, a stepping motor adapted to drive the screw 15a, and others.

The operation ring turn detection unit 21 is detection means adapted to detect a turning direction and turning amount of an operation ring 17 provided on the lens barrel 10, around an optical axis O. Also, the operation ring front/rear position detection unit 22 is detection means adapted to detect whether the operation ring 17 provided on the lens barrel 10 is located on a subject side position (first position) or a main body side position (second position) along the optical axis O.

The encoder unit 23 is detection means adapted to detect a turning position of a distance indicator wheel 18 when the operation ring 17 provided on the lens barrel 10 is located at the main body side position (second position). Although details will be described later, the encoder unit 23 is designed to detect an absolute position around the optical axis O with respect to a base portion 12.

The lens barrel control unit 24 includes a computing unit, a storage device, an input/output device, and the like and controls operation of the lens barrel 10 based on a predetermined program. The communications unit 25 is intended to conduct wired or wireless communications with the camera body control unit 6 via a communications unit 8 provided on the camera body 2.

The above has been the configuration of the system related to focusing operation applied to the camera system 1 according to the present embodiment. Besides, although not illustrated, a battery housing unit adapted to house a primary battery or secondary battery intended to supply power to the camera system 1 and a storage medium housing unit adapted to house a flash memory intended to store images are provided in the camera body 2.

Next, a detailed configuration of the lens barrel 10 applied to the camera system 1 according to the present embodiment will be described with reference to FIGS. 3 to 9.

Figure 3:
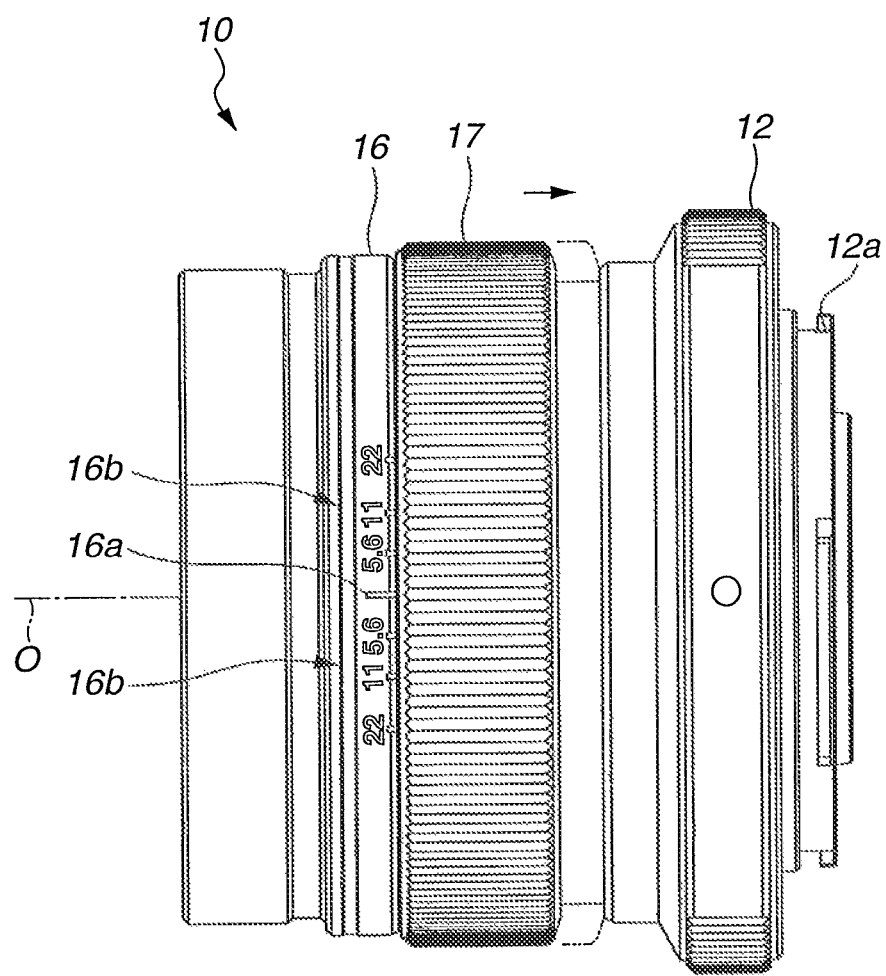
FIG. 3 is an overall view of the lens barrel with an operation ring located on a subject side position in the camera system of FIG. 1.
Figure 4:
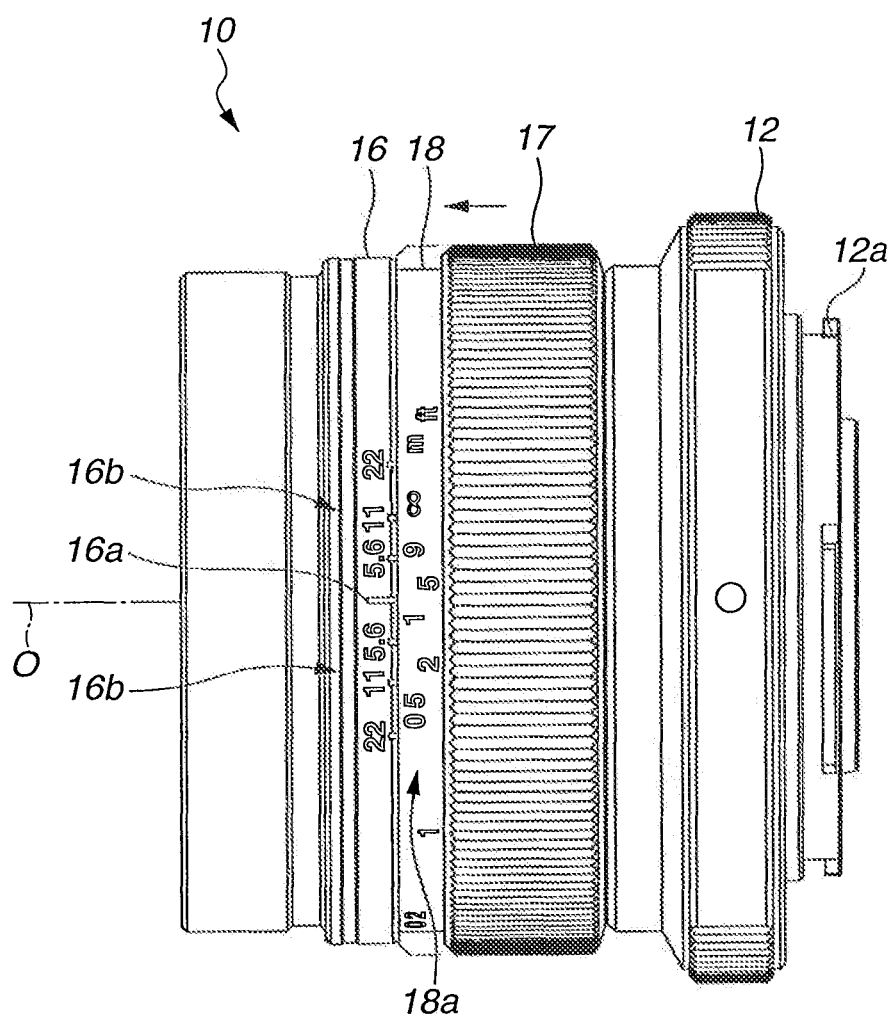
FIG. 4 is an overall view of the lens barrel with the operation ring located on a main body side position in the camera system of FIG. 1.

FIGS. 3 and 4 are diagrams for illustrating an overall external configuration of the lens barrel 10 and how a distance scale 18a indicated on the distance indicator wheel 18 is concealed and revealed by the operation ring 17 when the operation ring 17 moves along the optical axis O.

In FIG. 3, the base portion 12 is equipped with a bayonet unit 12a for use to detachably engage with an engaging portion (not shown) of the camera body 2 and is fixed to the camera body 2 as the bayonet unit 12a engages with the camera body 2. The base portion 12 makes up part of a fixed member according to the present invention.

Being located in an outer circumferential portion of the lens barrel 10, the operation ring 17 is a substantially cylindrical member configured to be able to be advanced and retracted by an operator between the subject side position (first position) shown in FIG. 3 and the main body side position (second position) shown in FIG. 4 and disposed turnably around the optical axis O at each of the subject side position (first position) and the main body side position (second position). The operation ring 17 turns around the optical axis O under a force applied to an operation portion 17a by fingers of a user's hand. Also, as shown in FIGS. 3 and 4, the operation ring 17 is movable along the optical axis O within a predetermined range and is disposed so as to be positioned selectively at one of both ends of the movable range when no external force is applied. That is, the operation ring 17 moves along the optical axis O from one end to the other end of the movable range under the force applied to the operation portion 17a by the user.

An index indicator barrel 16, which makes up part of a fixed member according to the present invention in conjunction with the base portion 12, has its position fixed with respect to the base portion 12 and makes up part of an exterior member of the lens barrel 10. The index indicator barrel 16 is provided with an index 16a used to point at the distance scale 18a provided on the distance indicator wheel 18 described later. Also, the index indicator barrel 16 has a depth-of-field index 16b provided on both sides of the index 16a in a circumferential direction to indicate a depth of field index corresponding to an f-number of the photographic optical system 11.

Incidentally, in FIG. 3, since the operation ring 17 is placed at the subject side position (first position) by the operator, the distance scale 18a provided on the distance indicator wheel 18 described later is concealed by the operation ring 17.

FIG. 4 is a diagram showing a state which results when the operation ring 17 is placed at the main body side position (second position) by the operator. When the operation ring 17 is located on the main body side position (second position), the distance scale 18a indicated on the distance indicator wheel 18 is revealed.

Although details will be described later, the distance indicator wheel 18 is turnable relative to the base portion 12. The distance indicator wheel 18 is a turning member configured to engage with the operation ring 17, becoming turnable around the optical axis O together with the operation ring 17 when the operation ring 17 which is an operation member is located on the main body side position (second position), and disengage from the operation ring 17 when the operation ring 17 is moved to the subject side position (first position) shown in FIG. 3 from the main body side position (second position).

On the distance scale 18a, numeric values which represent distances ranging from the closest focusing distance of the photographic optical system 11 to infinity are arranged in the circumferential direction. When the distance indicator wheel 18 is turned relative to the index indicator barrel 16 around the optical axis O, the numeric value on the distance scale 18a pointed at by the index 16a changes.

For example, if the operator wants to shoot a subject located at a distance of approximately 1.2 m, the operator sets a manual focusing mode using the focusing mode switching operation portion 5 and then places the operation ring 17 at the main body side position (second position). At the main body side position (second position), the operator sets the index 16a at approximately 1.2 m on the distance scale 18a of the distance indicator wheel 18 by turning the operation ring 17. Then, if an aperture of f/5.6 is used, it can be seen that focus is achieved in a range of 0.8 m to 3 m.

Figure 5:
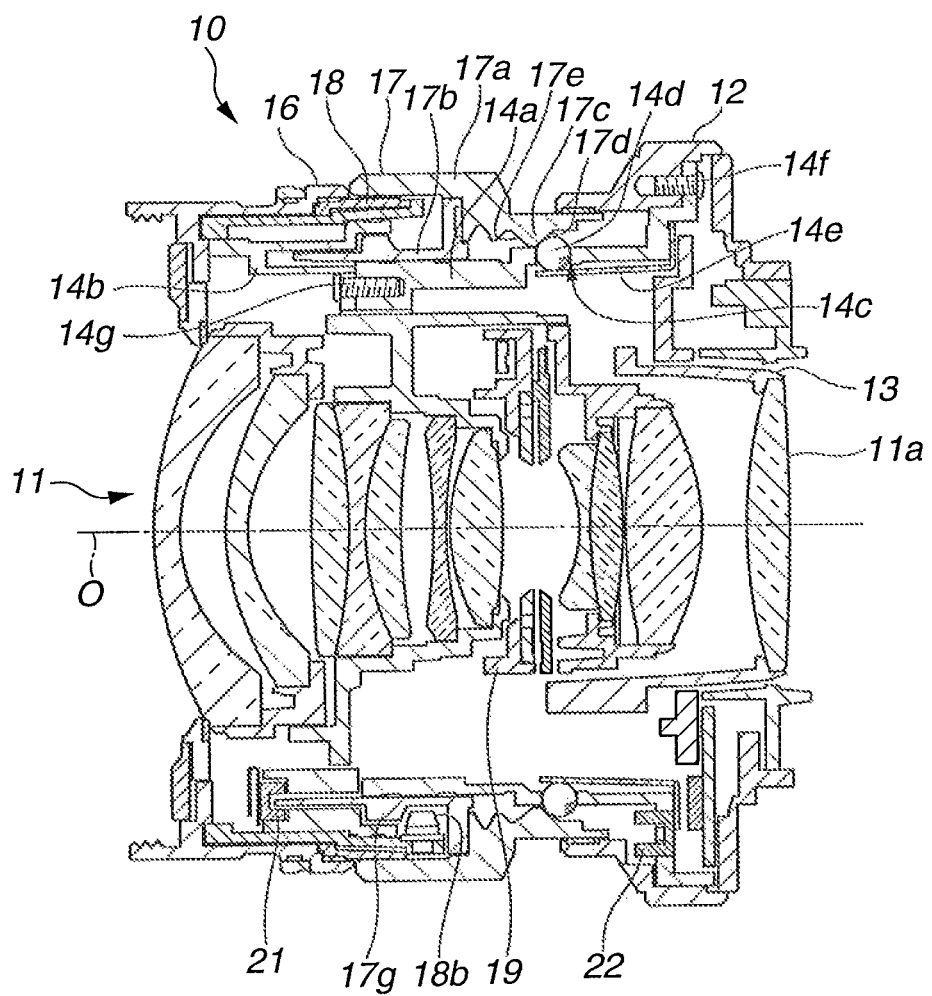
FIG. 5 is a sectional view of the lens barrel with the operation ring located on the subject side position in the camera system of FIG. 1.
Figure 6:
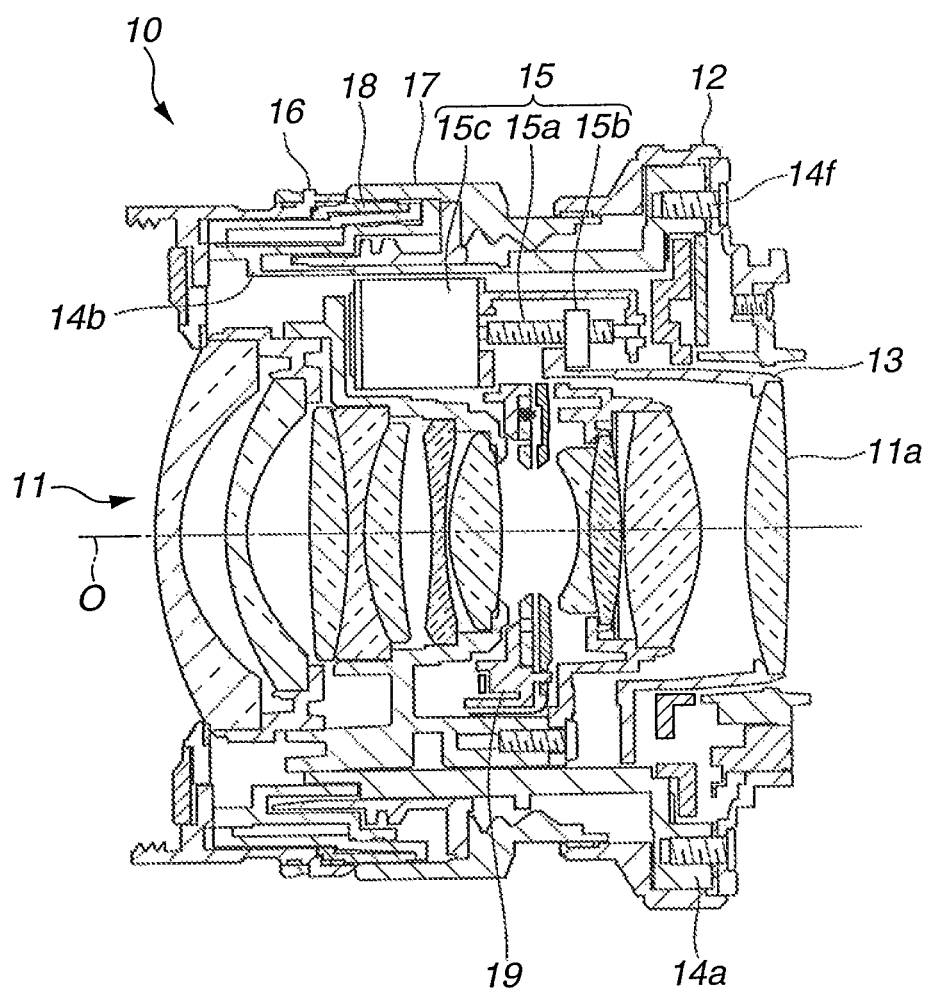
FIG. 6 is a sectional view of the lens barrel showing a drive system of a focus lens with the operation ring located on the subject side position in the camera system of FIG. 1.

FIGS. 5 and 6 are sectional views taken along the optical axis O in FIG. 3, showing a state which results when the operation ring 17 is placed at the subject side position (first position) by the operator.

As shown in FIG. 5, the lens barrel 10 includes the base portion 12, focusing barrel 13, actuator 15, index indicator barrel 16, distance indicator wheel 18, and operation ring 17 described above as well as the photographic optical system 11 made up of fixed barrels 14, plural lenses, and the like, and a mechanism which holds the lenses.

The photographic optical system 11 includes the focus lens 11a placed at the tail (image side) of the plural lenses and driven during focusing and a diaphragm mechanism 19 placed between a second group and a third group. The focus lens 11a, which is held by the focusing barrel 13 disposed advanceably/retractably relative to the base portion 12 along the optical axis O, is moved relatively along the optical axis O by the actuator 15 based on a detection signal (described later) and thereby driven to an in-focus position.

Incidentally, the photographic optical system 11 may be a folded optical system which includes a prism, mirror, and the like in addition to lenses. Also, a filter and the like may be included in the photographic optical system 11.

A first fixed barrel 14a and second fixed barrel 14b both annular in shape are fixed to the base portion 12. The annular first fixed barrel 14a and the annular second fixed barrel 14b correspond to a fixed portion according to the present invention or part of the fixed portion. The first fixed barrel 14a is fixed to the base portion 12 with plural screws 14f while the second fixed barrel 14b is fixed to the first fixed barrel 14a with plural screws 14g.

Plural through-holes 14c are formed circumferentially in the first fixed barrel 14a in order for balls 14d to fit in loosely.

The through-holes 14c are provided in locations where the balls 14d rest against a rib portion 17c of the operation portion 17a placed on an outer circumferential portion of the first fixed barrel 14a. The balls 14d loosely fitted in the through-holes 14c can protrude outward from an outer circumferential surface of the first fixed barrel 14a, being urged radially outward by an urging member 14e which is a leaf spring.

The rib portion 17c includes a first sloping portion 17d configured to protrude radially inward, shaped substantially triangular in cross section, and formed circumferentially around the entire circumference; and a second sloping portion 17e formed on a front side of the first sloping portion 17d. An inside diameter of the first sloping portion 17d decreases forward along the optical axis O while an inside diameter of the second sloping portion 17e increases forward along the optical axis O.

When the operation portion 17a is placed at the subject side position (first position), the balls 14d are urged by the urging member 14e toward the first sloping portion 17d of the rib portion 17c of the operation portion 17a, maintaining the position of the operation portion 17a.

Figure 7:
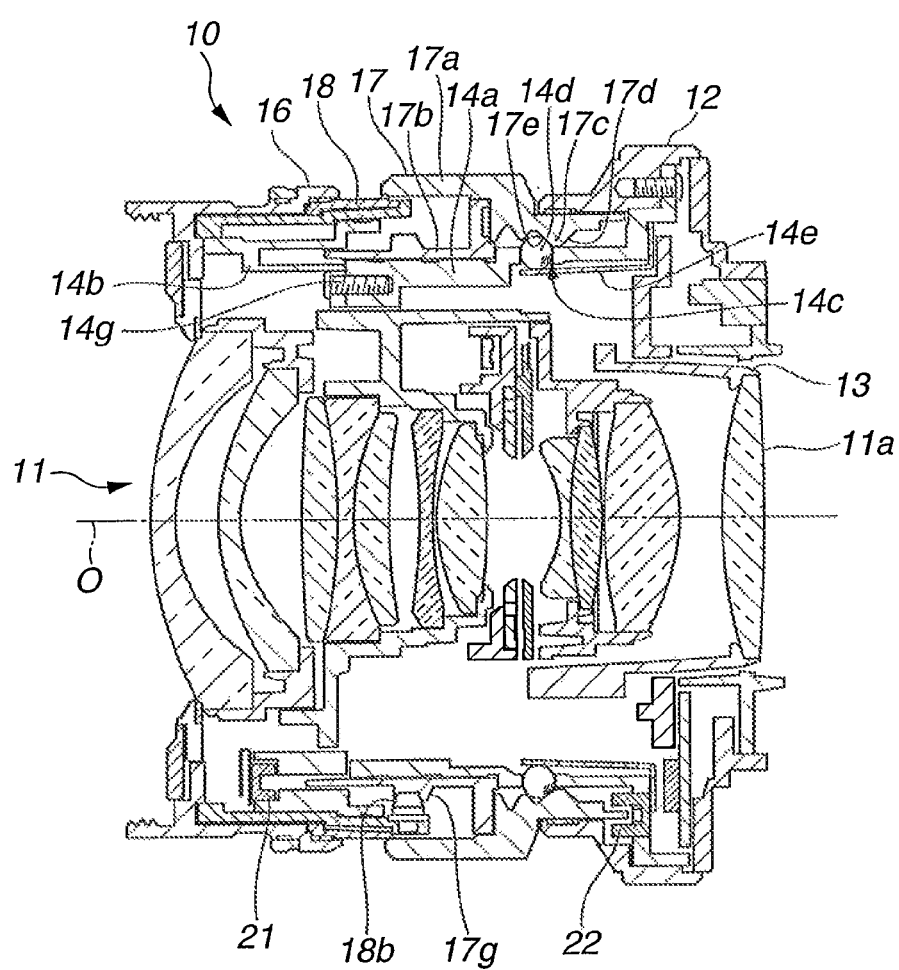
FIG. 7 is a sectional view of the lens barrel with the operation ring located on the main body side position in the camera system of FIG. 1.

Incidentally, the balls 14d abut the first sloping portion 17d of the rib portion 17c when the operation portion 17a is located at the subject side position (first position) (see FIG. 5), and abut the second sloping portion 17e of the rib portion 17c when the operation portion 17a is at the main body side position (second position) (see FIG. 7). Since the rib portion 17c has a substantially triangular cross sectional shape, the balls 14d always abut either the first sloping portion 17d or the second sloping portion 17e regardless of the position of the operation portion 17a.

Therefore, when located at the subject side position (first position), the operation portion 17a is urged forward by the balls 14d placed in abutment with the first sloping portion 17d and positioned against one end of the movable range at the first position.

On the other hand, as disclosed in FIG. 7, when located at the main body side position (second position), the operation portion 17a is urged toward the main body side by the balls 14d placed in abutment with the second sloping portion 17e and positioned against the other end of the movable range at the second position.

The operation ring 17 is made up of the operation portion 17a and an inner cylindrical portion 17b which are formed into an integral unit, where the operation portion 17a is configured to be substantially tubular in shape, exposed from an outer circumferential surface of the lens barrel 10, and provided with a straightly-knurled outer circumferential portion to be held by fingers of a user's hand while the inner cylindrical portion 17b is disposed inside the operation portion 17a with a predetermined clearance. According to the present embodiment illustrated in FIGS. 3 to 9, the operation portion 17a and the inner cylindrical portion 17b are different members which are fastened together, for example, by an adhesive or screws to make up the operation ring 17, but the operation portion 17a and the inner cylindrical portion 17b may be made of the same member as an integral member.

The inner cylindrical portion 17b is provided with an engaging portion 17g intended to integrally rotate the operation ring 17 and the distance indicator wheel 18 by engaging with the distance indicator wheel 18 when the operation ring 17 is located at the main body side position (second position).

Also, an engaging pin 18b is provided on an inner circumferential portion of the distance indicator wheel 18, protruding radially inward. According to the present embodiment, the engaging pin 18b is made of a member different from a member of the distance indicator wheel 18 and fastened to the distance indicator wheel 18 by press-fitting or an adhesive. However, the engaging pin 18b may be formed integrally with the distance indicator wheel 18.

Incidentally, a relationship of engagement between the inner cylindrical portion 17b and the engaging pin 18b provided on the inner circumferential portion of the distance indicator wheel 18 will be described later.

Also, the operation ring turn detection unit 21 is disposed on the second fixed barrel 14b of the lens barrel 10 to detect the turning direction and turning amount of the inner cylindrical portion 17b of the operation ring 17 around the optical axis O when the operation ring 17 is located on the subject side (first position). The operation ring turn detection unit 21 is disposed on the subject side of the second fixed barrel 14b. Also, since the inner cylindrical portion 17b is a component of the operation ring 17, the turning direction and turning amount of the operation ring 17 can be detected by detecting the position of the inner cylindrical portion 17b.

Furthermore, the operation ring front/rear position detection unit 22 is disposed on the first fixed barrel 14a of the lens barrel 10 to detect whether the operation ring 17 is located at the first position or the second position along the optical axis O. The operation ring front/rear position detection unit 22 is placed in a main-body-side end portion of the first fixed barrel 14a.

FIG. 6 is a sectional view taken along the optical axis O in FIG. 3, but is different from the sectional view of FIG. 5. Also, FIG. 6 is a diagram for illustrating a configuration of the actuator 15 adapted to drive the focus lens 11a. The same components as those in FIG. 5 are denoted by the same reference numerals as the corresponding components.

In FIG. 6, the actuator 15 adapted to drive the focus lens 11a is placed in an inner circumferential portion of the first fixed barrel 14a. The configuration of the actuator 15 is not particularly limited. However, according to the present embodiment, the actuator 15 includes the screw 15a disposed substantially parallel to the optical axis O, a stepping motor 15c adapted to rotate the screw 15a, and a nut 15b adapted to screw onto the screw 15a. The nut 15b which makes up part of the actuator 15 is engaged with the focusing barrel 13 configured to hold the focus lens 11a and follow the nut 15b.

The actuator 15 controls the stepping motor 15c based on computational values resulting from computations performed by the lens barrel control unit 24 based on output from the operation ring turn detection unit 21 or the encoder unit 23 described with reference to FIG. 2. The stepping motor 15c drives the nut 15b along the optical axis O by rotating the screw 15a. The focusing barrel 13 with the focus lens 11a provided thereon is driven along the optical axis O by a predetermined amount by following the nut 15b.

Incidentally, the configuration of the actuator 15 is not limited to that of the present embodiment, and another type such as a linear motor may be used alternatively. Also, the actuator 15 may be configured such that some components such as the stepping motor will be disposed in the camera body 2.

FIG. 7 is a sectional view taken along the optical axis O in FIG. 4, showing a state which results when the operation ring 17 is placed at the main body side position (second position) by the operator.

As described above, when the operation ring 17 is moved to the main body side position (second position) by the operator, the balls 14d abut the second sloping portion 17e of the rib portion 17c provided on an inner circumferential portion of the operation portion 17a, causing the operation portion 17a to be held at the main body side position (second position).

Also, since the operation ring 17 is placed at the main body side position (second position) by the operator, the distance scale 18a of the distance indicator wheel 18 is revealed as shown in FIG. 4. Furthermore, since the engaging portion 17g of the inner cylindrical portion 17b provided integrally with the operation portion 17a engages with the pin 18b of the distance indicator wheel 18, the distance indicator wheel 18 is turnable along with the operation portion 17a.

Figure 8:
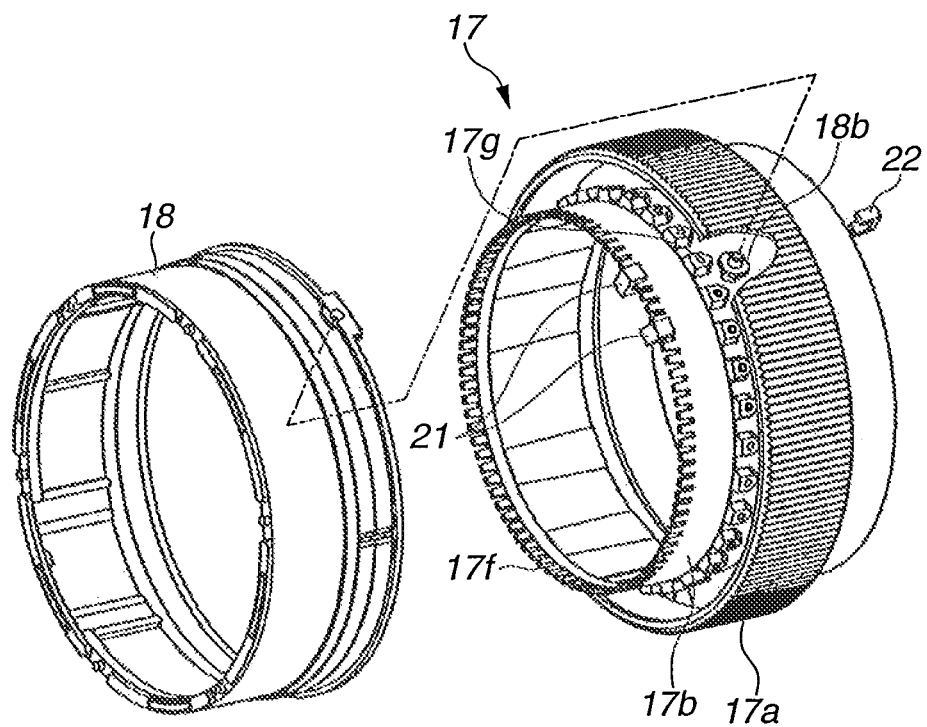
FIG. 8 is a perspective view illustrating a state in which the operation ring and a distance indicator wheel are disengaged from each other in the camera system of FIG. 1.
Figure 9:
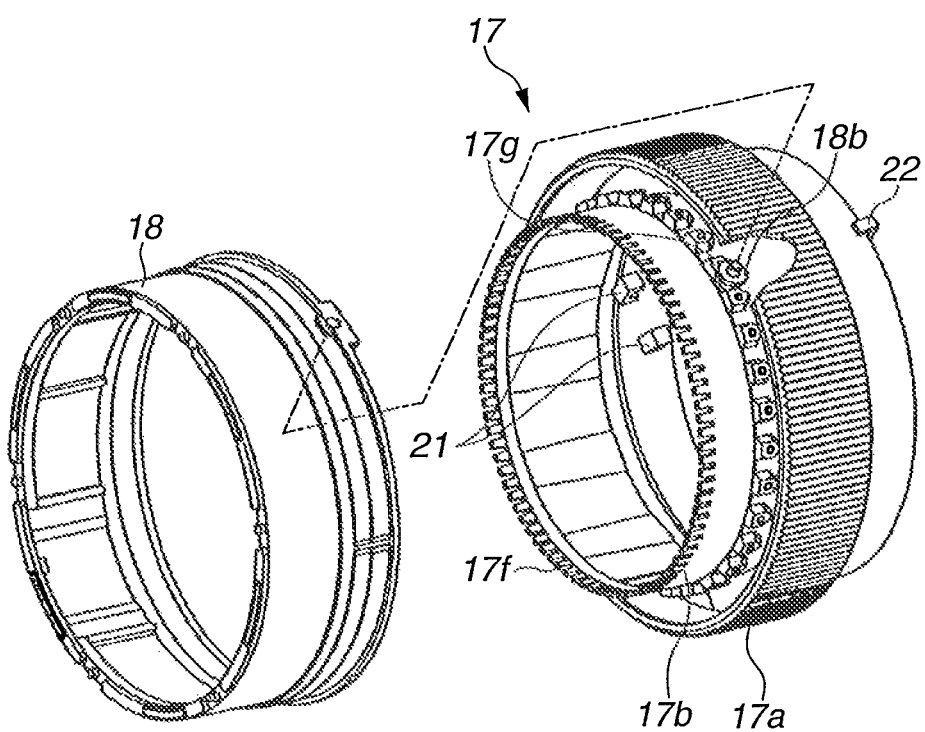
FIG. 9 is a perspective view illustrating a state in which the operation ring and a distance indicator wheel are engaged with each other in the camera system of FIG. 1.

FIGS. 8 and 9 are diagrams for illustrating a relationship of engagement between the operation ring 17 and the distance indicator wheel 18 as well as position detection of the operation ring 17, where the operation ring 17 is made up of the operation portion 17a and the inner cylindrical portion 17b: FIG. 8 is a diagram for illustrating a state which results when the operation portion 17a is moved to the subject side (first position) while FIG. 9 is a diagram for illustrating a state which results when the operation portion 17a is moved to the main body side position (second position).

As shown in FIG. 8, plural slit holes 17f are provided at equal intervals in the circumferential direction in one subject-side end portion of the inner cylindrical portion 17b of the operation ring 17.

As described with reference to FIGS. 5 and 7, the operation ring turn detection unit 21 is provided on the second fixed barrel 14b of the lens barrel 10. The operation ring turn detection unit 21 is a pair of photointerrupters which detect passage of the plural slit holes 17f provided in the inner cylindrical portion 17b of the operation ring 17, and then detect the turning direction and turning amount of the operation ring 17 based on a resulting output signal. The operation ring turn detection unit 21 according to the present embodiment and the slit holes 17f provided in the operation ring 17 have a form similar to that of a so-called incremental rotary encoder.

Only when the operation ring 17 is located at the subject side position (first position), the pair of photointerrupters detect the subject-side end portion of the inner cylindrical portion 17b where the slit holes 17f are formed. Therefore, the turning direction and turning amount of the operation ring 17 around the optical axis O can be detected only when the operation ring 17 is located at the first position, i.e., when the pair of photointerrupters are within a detection range.

The form of the operation ring turn detection unit 21 is not limited to that of the present embodiment as long as the turning direction and turning amount of the operation ring 17 around the optical axis O can be detected at least when the operation ring 17 is located at the subject side position (first position). For example, the operation ring turn detection unit 21 may be in the form of a magnetic rotary encoder.

Also, on an outer circumferential surface of the inner cylindrical portion 17b, plural projections of the engaging portion 17g are arranged in the circumferential direction, protruding radially outward and being spaced at predetermined intervals. When the plural projections are viewed radially from the outside, rear part of the plural projections are substantially V-shaped (on the main body side), narrowing in width toward the main body side.

As can be seen from FIGS. 5 and 8, the distance indicator wheel 18 is disposed between the operation portion 17a and inner cylindrical portion 17b of the operation ring 17. The engaging pin 18b disposed inside the distance indicator wheel 18 protrudes toward the outer circumferential surface of the inner cylindrical portion 17b. As shown in FIG. 8, the engaging pin 18b is disposed singly in a main-body-side end portion of the distance indicator wheel 18. An inside diameter of the engaging pin 18b is smaller than an outside diameter of the engaging portion 17g made up of the plural projections protruding radially outward.

Also, the engaging pin 18b is shaped so as to fit, with a predetermined clearance, in any of spaces between the projections arranged in the circumferential direction of the engaging portion 17g.

As shown in FIG. 5, when the operation ring 17 is located on the subject side (first position), the engaging pin 18b is located c loser to the main body side than is the engaging portion 17g of the operation ring 17 and is disposed in such a position as neither engage with, of course, nor interface with the engaging portion 17g even if the operation ring 17 is turned around the optical axis O. Therefore, when the operation ring 17 is located at the subject side position (first position), the engaging pin 18b remains stopped without turning even if the operation ring 17 is turned around the optical axis O.

Also, as shown in FIGS. 7 and 9, when the operation ring 17 is at the main body side position (second position), the engaging pin 18b is disposed at such a position as to overlap the engaging portion 17g in a direction perpendicular to the direction of the optical axis O. That is, when the operation ring 17 is at the main body side position (second position), the engaging pin 18b fits in any of spaces between the projections arranged in the circumferential direction of the engaging portion 17g, allowing the operation ring 17 and the distance indicator wheel 18 to turn together around the optical axis O.

As described above, since the plural projections of the engaging portion 17g are substantially V-shaped on the main body side as viewed radially from the outside, when the operation ring 17 is moved from the subject side position (first position) to the main body side position (second position), the substantially V-shaped portion follows the engaging pin 18b, turning the distance indicator wheel 18 slightly and thereby causing the engaging pin 18b and the engaging portion 17g to engage with each other smoothly. Consequently, the operation ring 17 moves along the optical axis O without a hitch, and thus can be moved quickly.

A turning range of the distance indicator wheel 18 is limited to a range in which a combination of the distance scale 18a and index 16a indicates numeric values of distances from the closest focusing distance of the photographic optical system 11 to infinity. Therefore, when engaged with the distance indicator wheel 18 at the main body side position (second position), the operation ring 17 is set to turn only at predetermined angles within the same turning range as the distance indicator wheel 18. On the other hand, when the operation ring 17 is at the subject side position (first position), since the operation ring 17 does not interfere with the distance indicator wheel 18, there is no limit to the turning range of the operation ring 17.

As shown in FIGS. 5, 7, and 9, the operation ring front/rear position detection unit 22 is a photointerrupter adapted to detect whether the operation ring 17 is located on the subject side (first position) or the main body side (second position). The operation ring front/rear position detection unit 22 is fixed to the base portion 12 which makes up the fixed portion according to the present invention or the fixed barrels 14 which make up the fixed portion according to the present invention. According to the present embodiment, the operation ring front/rear position detection unit 22 is fixed to the base portion 12 and adapted to detect that a part of the operation ring 17 has advanced to the main body side (second position).

Incidentally, the form of the operation ring front/rear position detection unit 22 is not particularly limited as long as the position of the operation ring 17 along the optical axis O can be detected. For example, the operation ring front/rear position detection unit 22 may be a magnetic sensor or the like.

Figure 10:
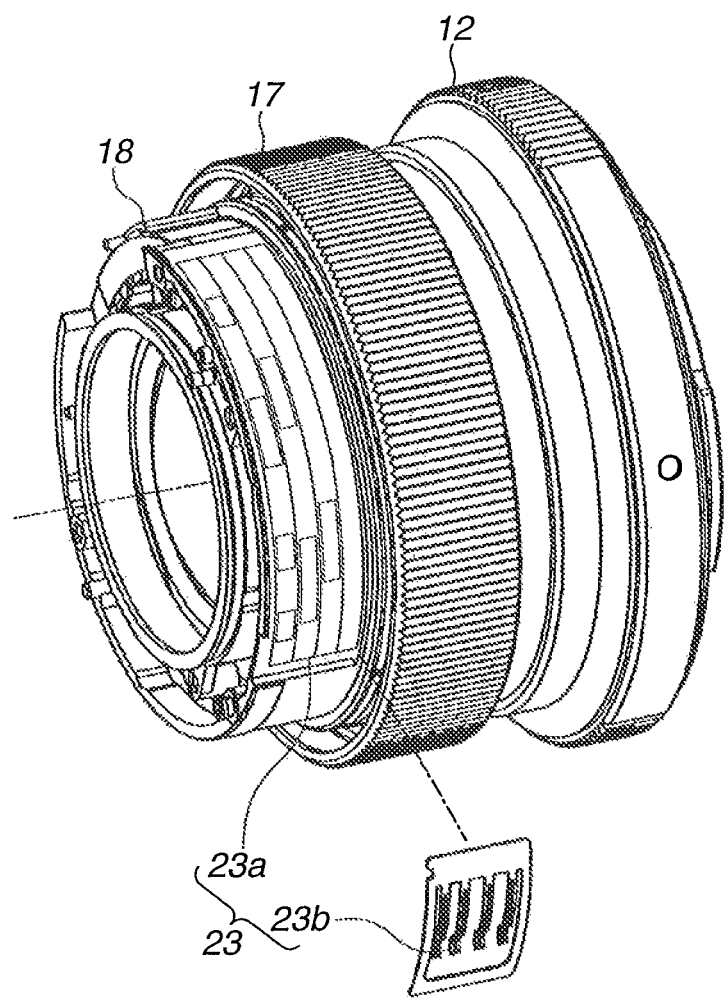
FIG. 10 is a perspective view illustrating a configuration of an encoder unit in the camera system of FIG. 1.

FIG. 10 is a diagram for illustrating detection means adapted to detect absolute position of the distance indicator wheel 18 which turns together with the operation ring 17 on the main body side (second position) when the operation ring 17 is detected to be located on the main body side (second position).

As shown in FIGS. 2 and 10, the encoder unit 23 adapted to detect an absolute turning position of the distance indicator wheel 18 around the optical axis O with respect to the base portion 12 is disposed in the lens barrel 10 according to the present embodiment. The encoder unit 23 is configured in the form of a so-called absolute rotary encoder. The encoder unit 23 includes a code pattern 23a of a predetermined bit count and a contact portion 23b adapted to slide over the code pattern 23a, where both the code pattern 23a and contact portion 23b are made of a conductive material.

The code pattern 23a is disposed in an outer circumferential portion of the distance indicator wheel 18 and the contact portion 23b is disposed on the second fixed barrel 14b. A contact position of the contact portion 23b on the code pattern 23a changes with the turning position of the distance indicator wheel 18 around the optical axis O. Although not illustrated, the encoder unit 23 includes an electric circuit adapted to detect a state of contact between the code pattern 23a and the contact portion 23b, and the absolute turning position of the distance indicator wheel 18 around the optical axis O with respect to the base portion 12 can be calculated based on a result of the detection.

The absolute turning position here is the position of the focus lens 11a and is determined in advance based on the state of contact between the code pattern 23a and the contact portion 23b. Based on output from the lens barrel control unit 24 and according to the state of contact, the actuator 15 described above drives the focus lens 11a to the position determined in advance (absolute position).

Incidentally, the configuration of the encoder unit 23 is not limited to that of the present embodiment as long as the absolute turning position around the optical axis O with respect to the base portion 12 can be detected. For example, the encoder unit 23 may be an optical or magnetic, absolute rotary encoder or may have a configuration similar to that of a so-called potentiometer whose resistance changes with the turning position of the distance indicator wheel 18 around the optical axis O.

Also, other lenses of the photographic optical system 11 may be driven by the actuator 15 in addition to the focus lens 11a.

Next, operation of the camera system 1 according to the present embodiment will be described.

Figure 11:
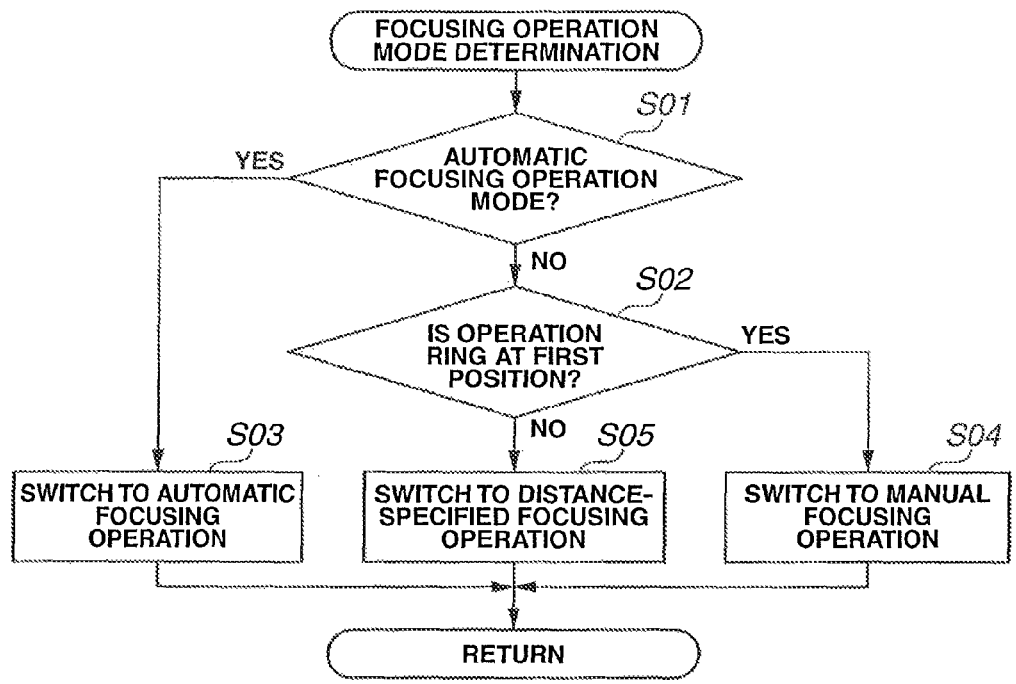
FIG. 11 is a flowchart of a focusing operation mode determination subroutine for the camera system of FIG. 1.

With the camera system 1 according to the present embodiment, when power is turned on and the camera body is in photo mode, the camera body control unit 6 runs a focusing operation mode determination subroutine shown in FIG. 11 in predetermined cycles. The focusing operation mode determination subroutine causes the focusing mode switching operation portion 5 to determine a focusing operation mode selected from among plural focusing operation modes of the camera system 1 based on a user command entered by a user and switches operation mode of the camera system 1 according to the user command.

In FIG. 11, according to the focusing operation mode determination subroutine, first in step S01, the camera system 1 determines whether the mode selected by the user using the focusing mode switching operation portion 5 is manual focusing operation mode or automatic focusing operation mode. If it is determined in step S01 that the automatic focusing operation mode is selected, the camera system 1 goes to step S03 to switch the operation of the camera system 1 to automatic focusing operation. Once step S03 is executed, the camera system 1 performs the automatic focusing operation shown in FIG. 12.

On the other hand, if it is determined in step S01 that the automatic focusing operation mode is not selected, i.e., if the camera system 1 is in the manual focusing operation mode in which the contrast-detection automatic focusing operation (autofocus operation) based on a signal from the image pickup device 9 is not performed, the camera system 1 goes to step S02 to determine whether the operation ring 17 exists on the subject side (first position) or the main body side (second position) based on an output signal from the operation ring front/rear position detection unit 22. If it is determined in step S02 that the operation ring 17 exists at the subject side (first position) position, the camera system 1 goes to step S04 to switch the operation of the camera system 1 so as to perform manual focusing operation.

Figure 13:
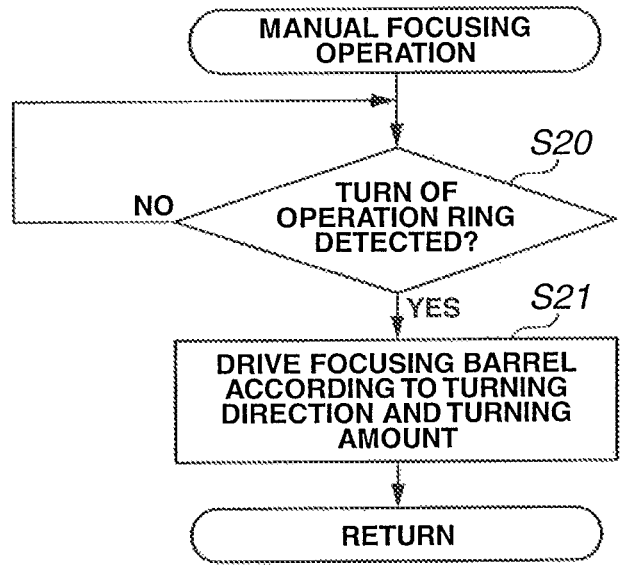
FIG. 13 is a flowchart of manual focusing operation in the camera system of FIG. 1.

Once step S04 is executed, the camera system 1 performs the manual focusing operation shown in FIG. 13. Although concrete operation will be described with reference to FIG. 13, the manual focusing operation, which is performed when a turn of the operation ring 17 is detected by the operation ring turn detection unit 21, involves driving the focusing barrel 13 according to the turning direction and turning amount of the operation ring 17 turned manually.

On the other hand, if it is determined in step S02 that the operation ring 17 does not exist on the subject side (first position), i.e., if it is determined that the operation ring 17 exists on the main body side (second position), the camera system 1 goes to step S05 to switch the operation of the camera system 1 so as to perform distance-specified focusing operation.

Although concrete operation will be described with reference to FIG. 14, the distance-specified focusing operation, which is performed when it is determined that the operation ring 17 exists on the main body side (second position), involves detecting the position of the operation ring 17 turned manually, as an absolute position, using the encoder unit 23 and driving the focusing barrel 13 (focus lens 11a) to the position (absolute position) determined in advance based on the state of contact between the code pattern 23a and the contact portion 23b.

Figure 12:
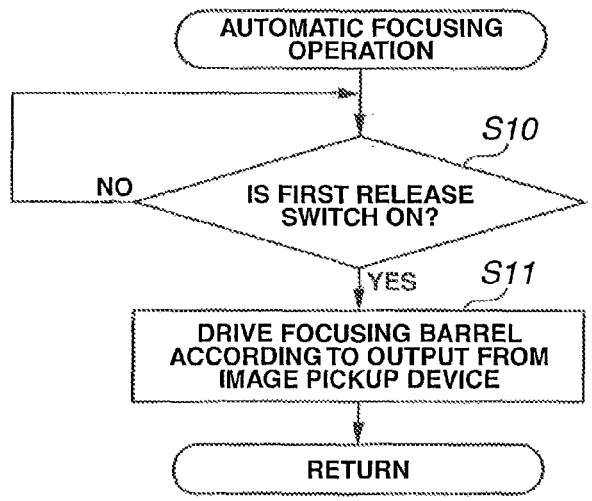
FIG. 12 is a flowchart of automatic focusing operation in the camera system of FIG. 1.
Figure 14:
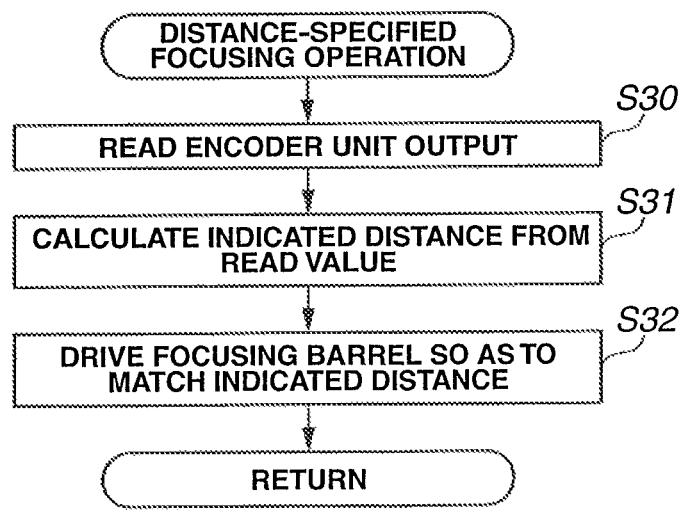
FIG. 14 is a flowchart of distance-specified focusing operation in the camera system of FIG. 1.

In steps S03 to S05, the camera system 1 is switched to respective operations, and corresponding subroutines shown in FIGS. 12 to 14 are executed. After any of the subroutines is executed, the camera system 1 returns to a main sequence of the camera.

A flowchart in FIG. 12 is an automatic focusing operation subroutine to which the camera system 1 is switched in step S03. If the first release switch 3a is activated by a half-press in step S10, automatic focusing operation is performed. In step S11, the camera system 1 detects a contrast value of the subject based on a signal outputted from the image pickup device 9 serving as the automatic focusing sensor unit and drives the focusing barrel 13 in such a way as to maximize the contrast value. Once the subroutine ends, the camera system 1 returns to the main sequence of the camera.

For example, in the case of the camera system 1 in which the camera body 2 and the lens barrel 10 are configured to be separable as with the present embodiment, to perform automatic focusing operation, the camera body control unit 6 issues instructions to drive the focusing barrel 13. In this case, to perform focus adjustment based on a signal outputted from the image pickup device 9, the lens barrel control unit 24 of the lens barrel 10 drives the focusing barrel 13 according to the instructions issued by the camera body control unit 6 and inputted via the communications unit 25.

In the case of the camera system 1 according to the present embodiment, automatic focusing operation is performed when the automatic focusing operation mode is selected and the operation ring 17 is at the subject side (first position) position. This is to give priority to the distance indicated by the distance scale 18a and index 16a, for example, when the distance is set to 1 m with the operation ring 17 placed on the main body side (second position) where the distance scale 18a is exposed to the outside, and thereby prevent focusing at infinity rather than at the distance of 1 m.

Incidentally, to deal with a situation in which a main subject moves fast, settings may be made to allow automatic focusing operation to be performed even after the operation ring 17 is moved to the main body side (second position). This will make it possible to achieve focus quickly, for example, even if the main subject moves quickly to a distance of 3 m after the distance is set to 1 m.

A flowchart in FIG. 13 is a manual focusing operation subroutine to which the camera system 1 is switched in step S04.

In step S20, the camera system 1 determines whether or not a turn of the operation ring 17 existing at the subject side (first position) position has been detected. If a turn of the operation ring 17 has been detected, the camera system 1 goes to step S21. In step S21, the camera system 1 makes the operation ring turn detection unit 21 detect the turning direction (turning angular velocity) and turning amount (turning angle) of the operation ring 17 turned manually at the subject side (first position) position. Then, based on results thus produced, the lens barrel control unit 24 drives the focusing barrel 13 by controlling the actuator 15. Once the subroutine shown in FIG. 13 ends, the camera system 1 returns to the main sequence of the camera.

On the other hand, if no turn of the operation ring 17 existing at the subject side (first position) position is detected in step S20, the camera system 1 maintains the state of manual focusing operation until the automatic focusing operation mode is selected via the focusing mode switching operation portion 5 provided on the camera body or the operation ring 17 provided on the lens barrel is moved from the subject side position (first position) to the main body side position (second position).

A flowchart in FIG. 14 is a distance-specified focusing operation subroutine to which the camera system 1 is switched in step S05.

In step S30, if it is detected that the operation ring 17 is located at the main body side position (second position) and the operation ring 17 is turned as well, the lens barrel control unit 24 reads an output value of the encoder unit 23 and detects the turn of the operation ring 17. The output value of the encoder unit 23 represents the absolute turning position of the distance indicator wheel 18 around the optical axis O with respect to the base portion 12. Once the turn of the operation ring 17, i.e., the output value of the encoder unit 23 is read by the encoder unit 23, the camera system 1 goes to step S31.

Next, in step S31, based on a conversion table prestored in a memory (not shown), the lens barrel control unit 24 calculates the numeric value of distance indicated by the distance scale 18a and index 16a from the output value of the encoder unit 23.

After the numeric value of distance indicated by the distance scale 18a and the index 16a is calculated by the lens barrel control unit 24, in step S32, the camera system 1 moves the focusing barrel 13 by driving the actuator 15 such that the focusing distance of the photographic optical system 11 will match the numeric value calculated by the lens barrel control unit 24. For example, if the numeric value of distance indicated by the distance scale 18a and the index 16a is 3 m, the focusing barrel 13 is moved such that the focusing distance of the photographic optical system 11 will be 3 m. Once the subroutine shown in FIG. 14 ends, the camera system 1 returns to the main sequence of the camera.

Ideally the focusing distance of the photographic optical system 11 coincides with the numeric value of distance indicated by the distance scale 18a and the index 16a, but if the encoder unit 23 has a low resolution, it is difficult to bring the two values into coincidence, and thus the focusing barrel 13 may be moved such that the two values will be approximately equal.

When the focusing barrel 13 is moved by distance-specified focusing operation subroutine, the lens barrel control unit 24 outputs the calculated numeric value of the distance indicated by the distance scale 18a and the index 16a to the camera body control unit 6 of the camera body 2 via the communications unit 25. The camera body control unit 6 determines an exposure value according to the received numeric value and attaches the numeric value as metadata to a photographed image.

The distance-specified focusing operation is maintained until the automatic focusing operation mode is selected via the focusing mode switching operation portion 5 provided on the camera body or the operation ring 17 provided on the lens barrel is moved from the main body side position (second position) to the subject side position (first position).

With any of the manual focusing operation and distance-specified focusing operation subroutines, the lens barrel control unit 24 moves the focusing barrel 13 in such a direction as to reduce the focusing distance of the photographic optical system 11 when a clockwise turn of the operation ring 17 is detected as the lens barrel 10 is viewed from the main body side, and moves the focusing barrel 13 in such a direction as to increase the focusing distance of the photographic optical system 11 when a counterclockwise turn of the operation ring 17 is detected.

As described above, the camera system 1 according to the present embodiment allows the user to select one of the automatic focusing operation and manual focusing operation by operating the focusing mode switching operation portion 5 or the operation ring 17.

When the automatic focusing operation is selected and the operation ring 17 is located at the subject side position (first position), focus adjustment is performed based on output from the image pickup device 9 serving as the focusing sensor unit regardless of the turning position of the distance indicator wheel 18. When the manual focusing operation is selected, the manual focusing operation described above can be selected by moving the operation ring 17 to the main body side position (second position) or the subject side position (first position).

More specifically, when the manual focusing operation mode is selected via the focusing mode switching operation portion 5 and the operation ring 17 is located on the subject side (first position), focus adjustment can be performed based on current position of the focus lens 11a by turning the operation ring 17. In the above-described manual focusing operation, since the operation ring 17 and the distance indicator wheel 18 are not engaged with each other, the operation ring 17 can be turned around the optical axis O without limit, and the focus adjustment of the focus lens 11a of the photographic optical system 11 is performed according to the turning amount of the operation ring 17 based on the current position of the focus lens 11a.

Such manipulations enable finer focus adjustment than the distance-specified focusing operation by means of a distance scale and are useful in macro photography or in photographic conditions under which the user wants to make a finer focus adjustment, moving further from a current focus adjustment state.

Also, when the manual focusing operation mode is selected via the focusing mode switching operation portion 5 and the operation ring 17 is located at the main body side position (second position), manual focusing can be performed using the distance scale. That is, by visually confirming the distance scale 18a, the index 16a, and the depth-of-field index 16b exposed on the outer circumferential portion of the lens barrel 10, the user can promptly verify and set the subject distance to be focused at.

Once the subject distance is set promptly during the distance-specified focusing operation, the focusing barrel 13 is forcibly driven to the position corresponding to the numeric value of distance indicated by the distance scale 18a and index 16a and calculated from an output signal of the encoder unit 23. Therefore, when the user wants to quickly set to a distance confirmed visually or a distance known in advance, by manually setting the distance scale 18a to a predetermined focusing distance, the user can carry out a photographic technique for photographing quickly without performing focus adjustment operation.

Thus, the camera system 1 according to the present embodiment makes it possible to selectively perform the distance-specified focusing operation and the manual focusing operation by moving the operation ring 17 forward or backward once, where the distance-specified focusing operation enables quick photographing by clearly showing a focusing distance and depth of field although focus adjustment is coarse and the manual focusing operation enables fine focus adjustment.

Since switching between the distance-specified focusing operation and the manual focusing operation can be done by simply moving the operation ring 17 forward or backward, the present embodiment can also be used to set to the desired focusing distance by manual focusing using the distance scale and make a finer focus adjustment, moving further from the current focus adjustment state if the operation ring 17 is moved to the main body side position (second position), the operation ring 17 is turned, the distance scale 18a is manually set to a predetermined desired focusing distance, and then the operation ring 17 is moved to the subject side (first position). This makes it possible to more quickly perform focus adjustment as desired.

This is because the present embodiment is configured such that when the operation ring 17 is located at the subject side position (first position), the operation ring 17 and the distance indicator wheel 18 will not be engaged with each other, disabling the distance indicator wheel 18 from turning even if the operation ring 17 turns. Moreover, the focusing distance established during the distance-specified focusing operation in which the operation ring 17 is located at the main body side position (second position) is not changed unless the manual focusing operation mode is set by moving the operation ring 17 to the subject side position (first position).

Also, the present embodiment can be used in the following manner.

In distance-specified focusing operation, the user can, for example, place the operation ring 17 at the main body side position (second position), preset the focusing distance to 3 meters by rotating the distance indicator wheel 18, subsequently move the operation ring 17 to the subject side position (first position), and adjust focus by manual focusing operation. Even if focus is adjusted by manual focusing operation, since the distance indicator wheel 18 does not turn, if the user subsequently wants to take a photograph, for example, at a focusing distance of 2 meters, the user can promptly set the focusing distance of the photographic optical system 11 to 2 meters by moving the operation ring 17 to the main body side position (second position).

In this way, if the focusing distance is set in advance to a desired value during distance-specified focusing operation, the user can take a photograph quickly at a desired focusing distance by simply moving the operation ring 17 backward from a state of performing manual focusing operation.

In the lens barrel 10 of the camera system 1 according to the present embodiment, since the actuator 15 drives only the focusing barrel 13 which holds the focusing photographic optical system 11a, the member driven by the actuator 15 can be made lightweight. Consequently, according to the present embodiment, the actuator 15 can be small in output and size, making it possible to downsize the lens barrel 10.

Furthermore, the present embodiment eliminates the need for a mechanism for transmitting power used to drive the distance indicator wheel 18, making it possible to transmit power from the actuator 15 to the focusing barrel 13 which is a driven member using a simple configuration with a small number of parts. This makes it easy to reduce volume of sound produced when the focusing barrel 13 is driven for focus adjustment. In particular, in shooting of moving images, the reduction of sound produced during focus adjustment has a great effect.

Incidentally, the lens barrel 10 according to the present embodiment has the form of a so-called single-focus lens which has fixed focal length, and the lenses other than the focus lens 11a of the photographic optical system 11 are held by the fixed barrels 14. However, if the lens barrel 10 is a so-called collapsible lens barrel whose overall length is expandable/collapsible, or a zoom lens or varifocal lens whose focal length is variable, plural barrel members may be used to hold the lenses other than the focus lens 11a and moved relative to the base portion 12.

As described so far, the present embodiment provides a lens barrel and camera system which allow the user, upon entering manual focusing mode, to switch to the distance-specified focusing operation mode that uses the distance scale or to the manual focusing operation mode with a single operation according to a photography scene and perform focus adjustment in the selected mode.

Also, after the switching, the lens barrel and camera system allow the user to check focusing state quickly based on the position of the operation ring 17. Furthermore, being capable of reducing the output and size of the actuator 15, the lens barrel and camera system make it possible to downsize the camera and the camera system.

Second Embodiment

A second embodiment of the present invention will be described below with reference to FIGS. 15 and 16.

Differences from the first embodiment will only be described below, wherein components similar to those of the first embodiment are denoted by the same reference numerals as the corresponding components, and description thereof will be omitted as appropriate.

Figure 15:
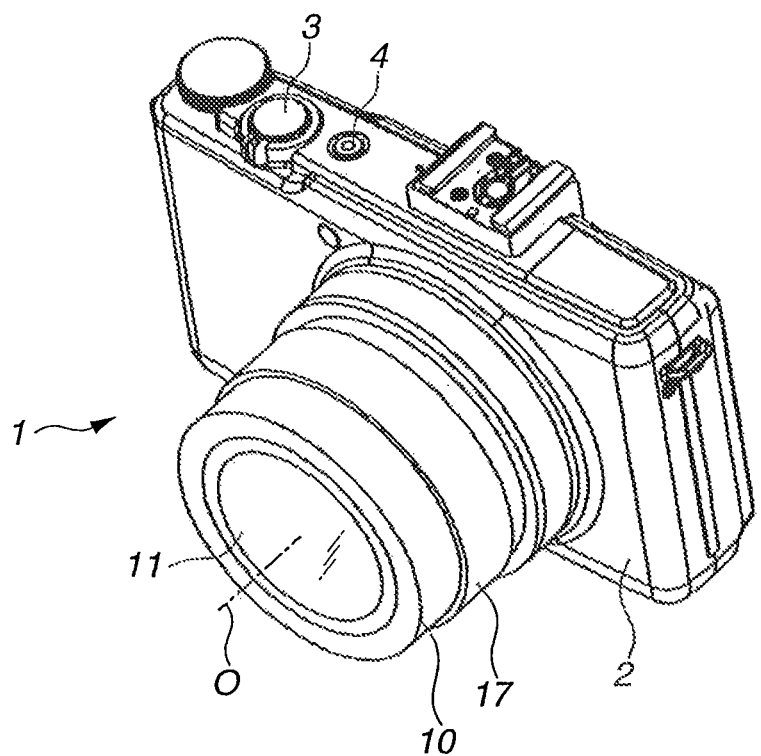
FIG. 15 is a perspective view showing a front side of a camera system according to a second embodiment of the present invention.

As shown in FIG. 15, the camera system 1 according to the present embodiment is configured to be an integral unit such that the camera body 2 and the lens barrel 10 will be inseparable. In the camera system 1 in which the camera body 2 and the lens barrel 10 are formed integrally as with the present embodiment, there is no need to dispose a separate control unit in both the camera body 2 and lens barrel 10, and a single control unit will suffice.

Figure 16:
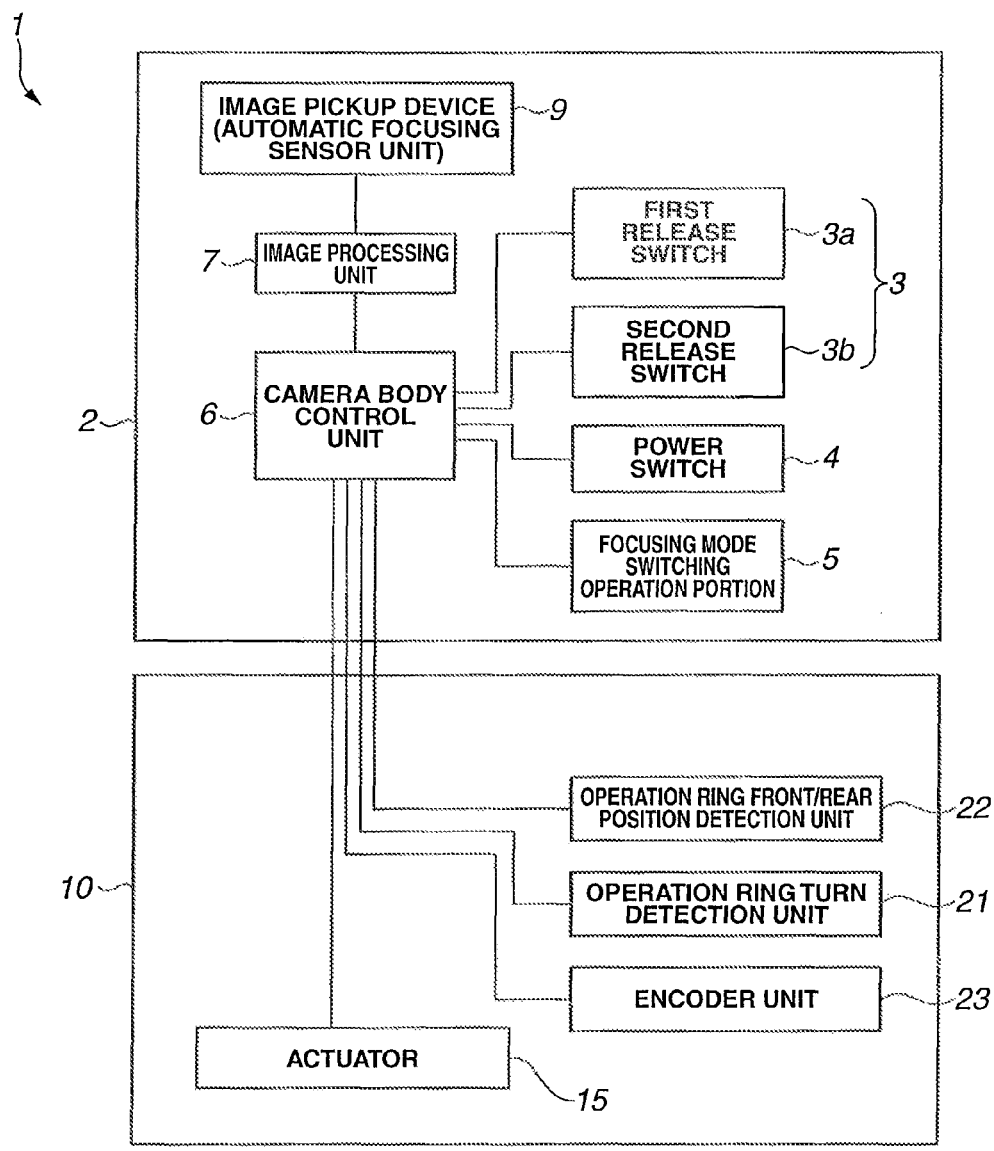
FIG. 16 is a block diagram of a configuration related to focusing operation of the camera system of FIG. 15.

FIG. 16 is a diagram showing the lens barrel 10 according to the first embodiment with the lens barrel control unit 24 and the communications unit 25 omitted, wherein the only control unit is the camera body control unit 6 disposed in the camera body 2. The camera body control unit 6 is configured to be able to also perform the control performed by the lens barrel control unit in the first embodiment. Regarding the rest of the configuration and operation, the camera system 1 according to the present embodiment is similar to the first embodiment. Thus, the camera system 1 according to the present embodiment provides advantages similar to those of the first embodiment.

Third Embodiment

A third embodiment of the present invention will be described below with reference to FIGS. 17 and 18.

The third embodiment differs from the first embodiment only in how the operation ring 17 and the distance indicator wheel 18 are configured to be engaged with each other. Differences from the first embodiment will only be described below, wherein components similar to those of the first embodiment are denoted by the same reference numerals as the corresponding components, and description thereof will be omitted as appropriate.

Figure 17:
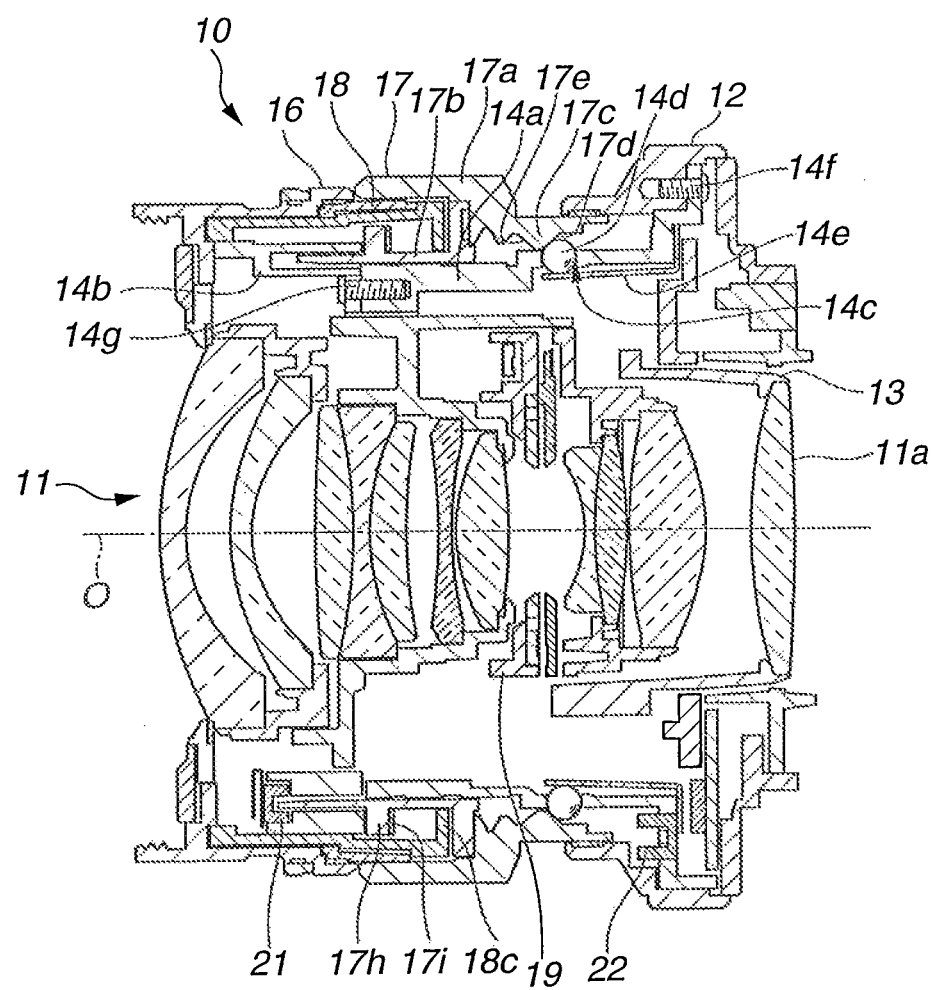
FIG. 17 is a sectional view of a lens barrel with an operation ring located on the subject side position, according to a third embodiment of the present invention.

FIG. 17 is a sectional view of the lens barrel 10 in a state in which the operation ring 17 is located on the subject side (first position) and the operation ring 17 and the distance indicator wheel 18 are not engaged. FIG. 18 is a sectional view of the lens barrel 10 in a state in which the operation ring 17 is located on the body side (second position) and the operation ring 17 and the distance indicator wheel 18 are engaged.

A feature of the present embodiment is that the operation ring 17 and the distance indicator wheel 18 are engaged with each other by friction therebetween.

Figure 18:
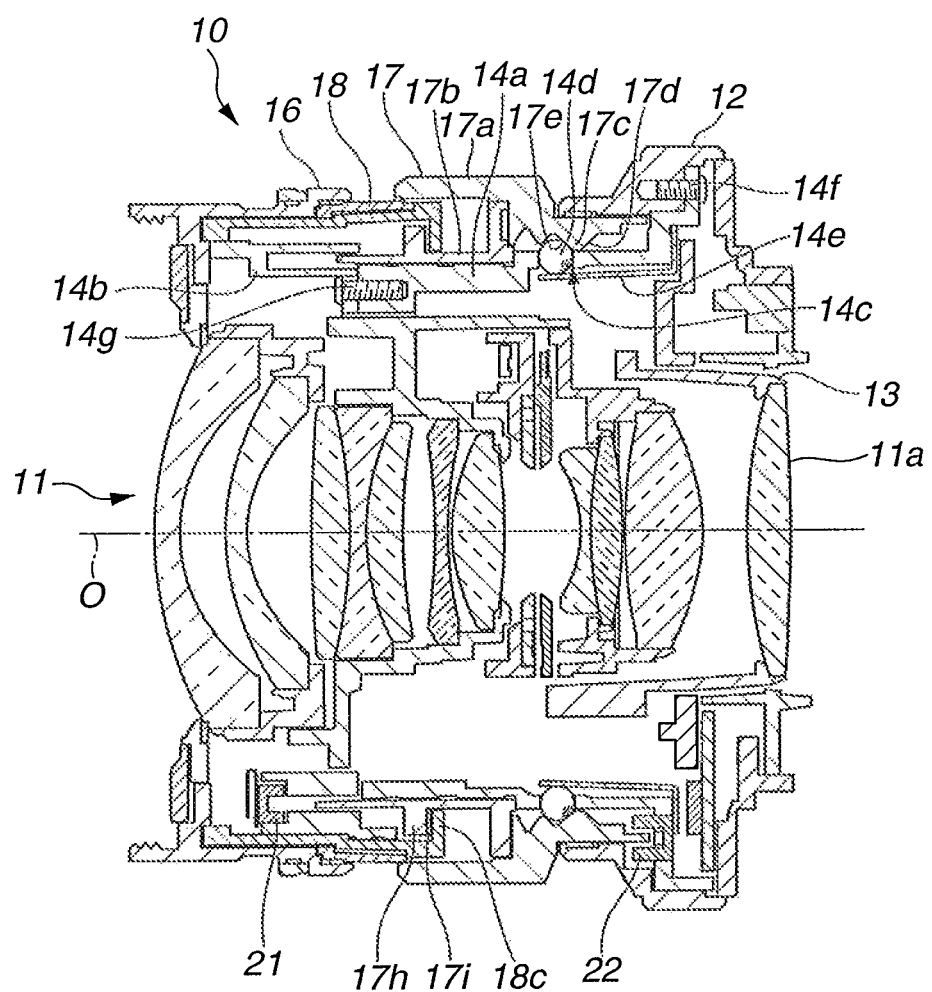
FIG. 18 is a sectional view of the lens barrel with the operation ring located on the main body side position in the camera system of FIG. 17.

In FIGS. 17 and 18, a flange portion 17h is provided on the outer circumferential portion of the inner cylindrical portion 17b of the operation ring 17, protruding radially outward. On the other hand, a flange portion 18c is provided on the distance indicator wheel 18 disposed on the outer circumference of the inner cylindrical portion 17b, protruding radially inward at a location closer to the main body side than is the flange portion 17h.

As shown in FIG. 17, when the operation ring 17 is located at the first position, the flange portion 17h of the inner cylindrical portion 17b and the flange portion 18c of the distance indicator wheel 18 face each other, being spaced away from each other along the optical axis O, and no frictional force acts between the flange portion 17h and the flange portion 18c. Consequently, the distance indicator wheel 18 does not turn even if the operation ring 17 turns.

On the other hand, as shown in FIG. 18, when the operation ring 17 is located at the second position, since the operation ring 17 is urged backward relative to the distance indicator wheel 18 by the urging member 14e and the balls 14d, the inner cylindrical portion 17b of the operation ring 17 is pressed against the flange portion 18c of the distance indicator wheel 18 along the optical axis O by the urging force, coming into abutment with the latter. Contact surfaces between the inner cylindrical portion 17b of the operation ring 17 and the flange portion 18c of the distance indicator wheel 18 are structured to produce frictional forces against each other, causing the operation ring 17 and the distance indicator wheel 18 to turn together.

Specifically, the inner cylindrical portion 17b of the operation ring 17 and the flange portion 18c of the distance indicator wheel 18 may be configured to mesh with each other in frictional engagement such that the contact surface of at least the inner cylindrical portion 17b and the flange portion 18c will produce a frictional force or a friction material (e.g., resin material such as rubber) may be glued to at least one of the contact surfaces.

Alternatively, at least one of the opposing surfaces of the flange portion 17h and flange portion 18c may be subjected to surface treatment so as to increase a friction coefficient between the two surfaces. As an example, according to the present embodiment, rubber (made of resin material) which is a high-friction material 17i is glued to a main-body-side surface of the flange portion 17h.

As described above, according to the present embodiment, since the engagement between the operation ring 17 and the distance indicator wheel 18 is maintained by the friction between the two, when the operation ring 17 is moved to the main-body position (second position), the distance indicator wheel 18 can be turned together.

Regarding the rest of the configuration and operation, the camera system 1 according to the third embodiment is similar to the first or second embodiment. Thus, the camera system 1 according to the third embodiment provides advantages similar to those of the first or second embodiment.

Fourth Embodiment

A fourth embodiment of the present invention will be described below with reference to FIGS. 19 and 20.

The fourth embodiment differs from the first embodiment only in how the operation ring 17 and the distance indicator wheel 18 are configured to be engaged with each other. Differences from the first embodiment will only be described below, wherein components similar to those of the first embodiment are denoted by the same reference numerals as the corresponding components, and description thereof will be omitted as appropriate. A feature of the present embodiment is that the operation ring 17 and the distance indicator wheel 18 are engaged with each other by friction therebetween as in the case of the third embodiment.

Figure 19:
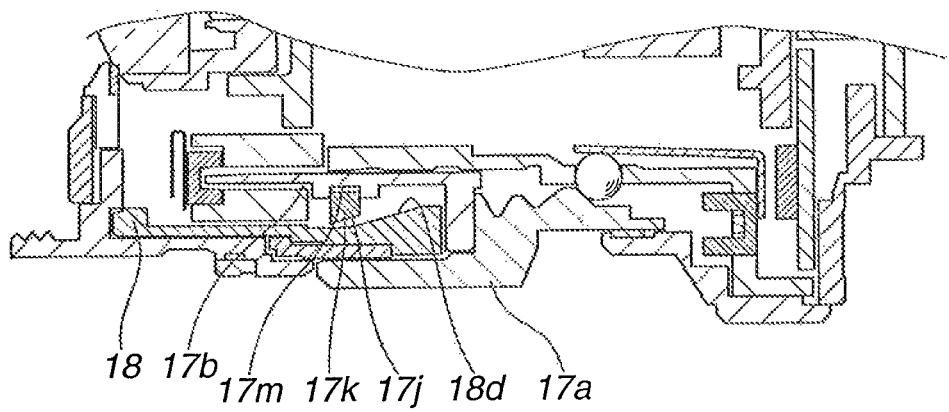
FIG. 19 is a sectional view of a lens barrel with an operation ring located on the subject side position in a camera system according to a fourth embodiment of the present invention.

FIG. 19 is a partial sectional view of the lens barrel 10 in a state in which the operation ring 17 is located on the subject side (first position) and the operation ring 17 and the distance indicator wheel 18 are not engaged. FIG. 20 is a partial sectional view of the lens barrel 10 in a state in which the operation ring 17 is located on the main body side (second position) and the operation ring 17 and the distance indicator wheel 18 are engaged.

Figure 20:
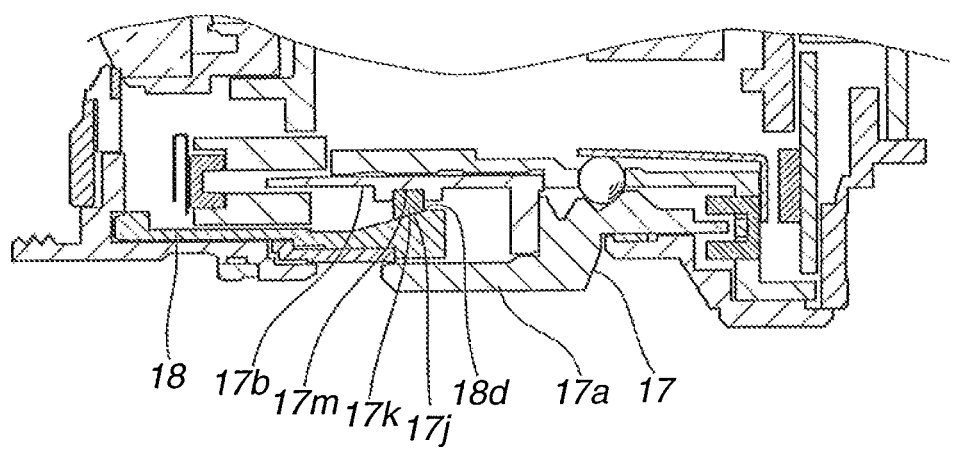
FIG. 20 is a sectional view of the lens barrel with the operation ring located on the main body side position in the camera system of FIG. 19.

In FIGS. 19 and 20, a groove portion 17m is carved in a circumferential direction in the outer circumferential portion of the inner cylindrical portion 17b of the operation ring 17. A C-ring 17k substantially C-shaped with part of an annular shape cut away is fitted in the groove portion 17m. The C-ring 17k has an inside diameter shaped to fit in a bottom face of the groove portion 17m with a predetermined clearance, and a tapered portion 17j is provided on an outer circumferential portion of the C-ring 17k such that an outer diameter of the C-ring 17k will decrease toward the main body side when the C-ring 17k is fitted in the groove portion 17m.

On the other hand, in FIGS. 19 and 20, facing the tapered portion 17j of the C-ring 17k, a tapered portion 18d is formed on the inner circumferential portion of the distance indicator wheel 18 such that the inside diameter of the distance indicator wheel 18 will decrease toward the main body side.

As shown in FIG. 19, the operation ring 17 is located on the subject side (first position), and when the operation ring 17 and the distance indicator wheel 18 are not engaged with each other, the tapered portion 17j of the C-ring 17k and the tapered portion 18d of the distance indicator wheel 18 face each other, being spaced away from each other along the optical axis O. Therefore, no frictional force acts between the operation ring 17 and the distance indicator wheel 18. Consequently, the distance indicator wheel 18 does not turn even if the operation ring 17 turns.

On the other hand, as shown in FIG. 20, when the operation ring 17 moves from the subject side (first position) position to the main body side (second position) position, the C-ring 17k provided on the operation ring 17 moves to the main body side along the optical axis O and the tapered portion 17j of the C-ring 17k and the tapered portion 18d of the distance indicator wheel 18 are urged toward the main body side in abutment with each other. This action compresses the C-ring 17k radially inward in such a way as to reduce the inside diameter of the C-ring 17k, bringing an inner circumferential surface of the C-ring 17k into contact with the bottom face of the groove portion 17m.

When the operation ring 17 is located at the second position, an urging force which urges the operation ring 17 toward the main body side provide a force tending to press the operation ring 17 against the distance indicator wheel 18, and consequently a frictional force is generated between the operation ring 17 and the distance indicator wheel 18, allowing both the operation ring 17 and the distance indicator wheel 18 to turn.

That is, according to the present embodiment, friction between the tapered portion 17j and the tapered portion 18d as well as friction between the inner circumferential surface of the C-ring 17k and the bottom face of the groove portion 17m bring the operation ring 17 and the distance indicator wheel 18 into frictional engagement with each other, making it possible to reduce an amount of change in the turning position of the distance indicator wheel 18.

Regarding the rest of the configuration and operation, the camera system 1 according to the present embodiment is similar to the first to third embodiments. Thus, the camera system 1 according to the present embodiment provides advantages similar to those of the first to third embodiments.

Fifth Embodiment

A fifth embodiment of the present invention will be described below with reference to FIG. 21.

The fifth embodiment differs from the first to fourth embodiments in the focusing operation mode determination subroutine. Differences from the first embodiment will only be described below, wherein components similar to those of the first embodiment are denoted by the same reference numerals as the corresponding components, and description thereof will be omitted as appropriate.

Figure 21:
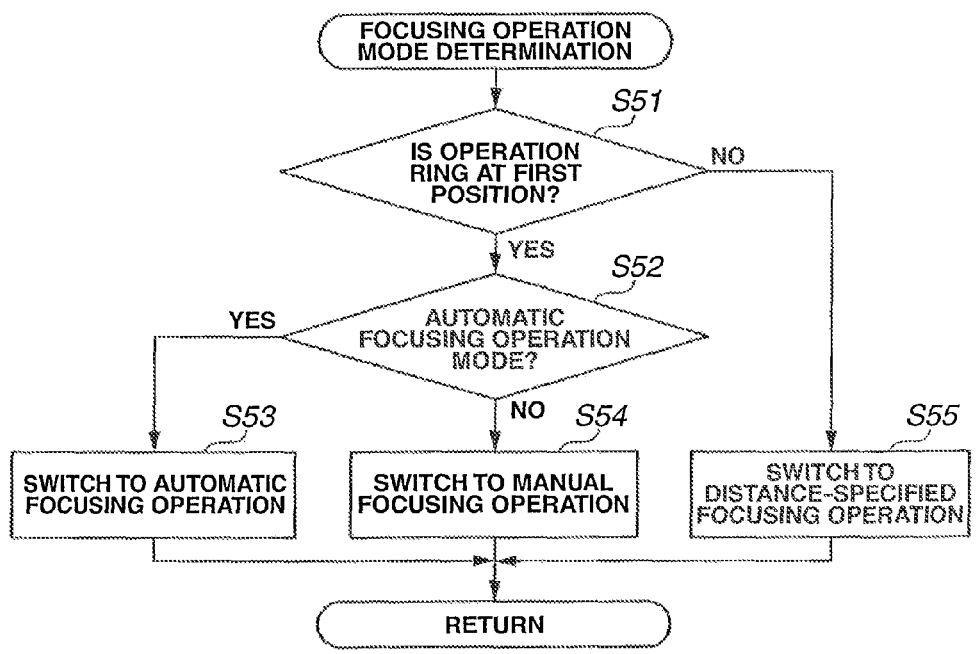
FIG. 21 is a flowchart of a focusing operation mode determination subroutine for a camera system according to a fifth embodiment of the present invention.

FIG. 21 is a flowchart of the focusing operation mode determination subroutine for a camera system according to the fifth embodiment. According to the present embodiment, first, in step S51, the camera system 1 determines whether the operation ring 17 exists on the subject side (first position) or the main body side (second position) based on an output signal from the operation ring front/rear position detection unit 22. If it is determined in step S51 that the operation ring 17 does not exist on the subject side (first position), the camera system 1 goes to step S55, determinines that the operation ring 17 exists on the main body side (second position) and switches its operation to perform the distance-specified focusing operation shown in FIG. 14.

On the other hand, if it is determined in step S51 that the operation ring 17 exists on the subject side (first position), the camera system 1 goes to step S52. In step S52, the camera system 1 determines whether or not the user has selected the automatic focusing operation mode using the focusing mode switching operation portion 5.

If it is determined in step S52 that the automatic focusing operation mode is selected, the camera system 1 goes to step S53 and switches its operation to perform automatic focusing operation. On the other hand, if it is determined in step S52 that the automatic focusing operation mode is not selected, the camera system 1 determines that the operation ring 17 exists on the subject side (first position) and that the camera system 1 is in manual focusing operation mode, and switches its operation to perform the manual focusing operation shown in FIG. 13.

As described above, with the focusing operation mode determination subroutine according to the present embodiment, it is determined first whether the operation ring 17 is located at the first position or the second position. Consequently, if the operation ring 17 is located at the second position, control is performed such that the focusing operation mode determination subroutine will end by executing step S55. After the camera system 1 is switched to the operation corresponding to any of steps S53 to S55, when the corresponding subroutine is executed and terminated, the camera system 1 returns to the main sequence of the camera.

According to the present embodiment, when the user moves the operation ring 17 to the second position, the camera system 1 always performs distance-specified focusing operation. This allows the user to switch quickly to distance-specified focusing operation that uses the distance scale from a state of performing automatic focusing operation.

Except for the focusing operation mode determination subroutine described above, the configuration of the present embodiment is similar to the first embodiment. Thus, the camera system 1 according to the present embodiment provides advantages similar to those of the first to fourth embodiments described above.

It should be noted that the present invention is not limited to the embodiments described above. Thus, needless to say, various alterations and applications are possible without departing from the spirit of the invention. Furthermore, the embodiments described above include inventions at various stages, and various inventions can be extracted through appropriate combinations of the disclosed components. For example, even if some of the components are removed from any of the embodiments described above, the resulting configuration can be extracted as a form of the present invention as long as the configuration can solve the problems to be solved by the invention and provide the advantages described above. Accordingly, the present invention is to be limited only by the appended claims and not by any specific embodiment thereof.

The present invention is applicable not only to the camera system which has the form of a digital camera described in the above embodiments, but also to electronic devices equipped with an image pickup function, such as recording devices, portable communications terminals, personal computers, game machines, digital media players, television sets, GPS navigation systems, and watches.

What is claimed is:

1. A lens barrel comprising:
a fixed portion in which an optical system including a focusing lens is placed;
an operation member placed so as to be movable to a first position and a second position along an optical axis of the fixed portion and turnable around the optical axis at each of the first position and the second position;
a turning member adapted to turnably engage with the operation member when the operation member moves to the second position, and disengage from the operation member when the operation member moves from the second position to the first position;
first detection means adapted to detect a turning position of the turning member when the operation member and the turning member turn in engagement at the second position;
second detection means adapted to detect a turning amount and a rotational direction of the operation member when the operation member turns by being disengaged from the turning member after moving to the first position; and
moving means placed in the fixed portion and adapted to move the focusing lens along the optical axis based on a computational value obtained by computation using at least an output value from the first or second detection means.

2. The lens barrel according to claim 1, wherein
the moving means is controlled so as to move the focusing lens to a predetermined position starting from a current position of the focusing lens by an amount of travel based on the turning amount detected by the first detection means when moving the focusing lens along the optical axis based on an output from the first detection means, and
controlled so as to move the focusing lens to a predetermined corresponding position using the turning position detected by the second detection means as an absolute position when moving the focusing lens along the optical axis based on an output from the second detection means.

3. The lens barrel according to claim 1, wherein
the lens barrel is fixed to the camera body in advance or detachably mounted on the camera body.

4. The lens barrel according to claim 1, wherein:
an index indicator unit indicating aperture stops is provided at a predetermined position on the fixed portion;
a distance indicator unit corresponding to the index indicator unit is provided at a predetermined position on an outer circumferential portion of the turning member; and
the distance indicator unit provided on the turning member is exposed when the turning member moves to the second position, and is hidden by being covered with the operation member when the turning member moves from the second position to the first position.

5. The lens barrel according to claim 1, wherein
a convex portion is provided on one of the operation member and the turning member, and an engaging portion adapted to engage with the convex portion is provided on the other of the operation member and the turning member.

6. The lens barrel according to claim 5, wherein
the engaging portion is a plurality of convex blocks placed at equal intervals on the other of the operation member and the turning member.

7. A camera system comprising a camera body and a lens barrel detachable from the camera body, the camera body and the lens barrel being able to communicate with each other wherein:
the lens barrel comprises:
a fixed portion in which an optical system including a focusing lens is placed,
an operation member placed so as to be movable to a first position and a second position along an optical axis of the fixed portion and turnable around the optical axis at each of the first position and the second position,
a turning member adapted to turnably engage with the operation member when the operation member moves to the second position, and disengage from the operation member when the operation member moves from the second position to the first position, first detection means adapted to detect a turning position of the turning member when the operation member and the turning member turn in engagement at the second position, second detection means adapted to detect a turning amount and a rotational direction of the operation member when the operation member turns by being disengaged from the turning member after moving to the first position, and moving means placed in the fixed portion and adapted to move the focusing lens along the optical axis; and the camera body comprises control means adapted to move the focusing lens along the optical axis by controlling the moving means based on an output from the first detection means or the second detection means; and the control means moves the focusing lens to a predetermined position starting from a current position of the focusing lens by an amount of travel based on the rotational direction and turning amount detected by the first detection means when moving the focusing lens along the optical axis based on the output from the first detection means, and moves the focusing lens to a predetermined corresponding position using the turning position detected by the second detection means as an absolute position when moving the focusing lens along the optical axis based on the output from the second detection means.

8. The camera system according to claim 7, wherein:

an index indicator unit concerning aperture stops is provided at a predetermined position on the fixed portion of the lens barrel;

a distance indicator unit corresponding to the index indicator unit is provided at a predetermined position on an outer circumferential portion of the turning member of the lens barrel; and the distance indicator unit provided on the turning member is exposed when the turning member moves to the second position, and is hidden by being covered with the operation member when the turning member moves from the second position to the first position.

9. The camera system according to claim 7, wherein a convex portion is provided on one of the operation member provided on the lens barrel and the turning member provided on the lens barrel, and an engaging portion adapted to engage with the convex portion is provided on the other of the operation member and the turning member.

10. The camera system according to claim 8, wherein the engaging portion is a plurality of convex blocks placed at equal intervals on the other of the operation member and the turning member.

11. The camera system according to claim 9, wherein the engaging portion is a plurality of convex blocks placed at equal intervals on the other of the operation member and the turning member.

* * * * *